United States Patent
Bolosky et al.

[19]

[11] Patent Number: 6,134,596
[45] Date of Patent: Oct. 17, 2000

[54] CONTINUOUS MEDIA FILE SERVER SYSTEM AND METHOD FOR SCHEDULING NETWORK RESOURCES TO PLAY MULTIPLE FILES HAVING DIFFERENT DATA TRANSMISSION RATES

[75] Inventors: William J. Bolosky, Issaquah; John R. Douceur, Bellevue, both of Wash.

[73] Assignee: Microsoft Corporation, Redmond, Wash.

[21] Appl. No.: 08/934,972

[22] Filed: Sep. 18, 1997

[51] Int. Cl.[7] ........................... G06F 15/16; G06F 15/167
[52] U.S. Cl. ........................... 709/233; 709/232; 709/213
[58] Field of Search ................... 709/232, 104, 709/233, 213; 455/4.2; 370/394; 348/7; 345/327; 710/21; 714/1

[56] References Cited

U.S. PATENT DOCUMENTS

| | | | |
|---|---|---|---|
| 5,414,845 | 5/1995 | Behm et al. | 709/104 |
| 5,434,994 | 7/1995 | Shaheen et al. | 395/500 |
| 5,446,874 | 8/1995 | Waclawsky et al. | 714/1 |
| 5,473,362 | 12/1995 | Fitzgerald et al. | 348/7 |
| 5,499,046 | 3/1996 | Schiller et al. | 348/6 |
| 5,499,341 | 3/1996 | Wilson et al. | 710/21 |
| 5,548,724 | 8/1996 | Akizawa et al. | 395/200.03 |
| 5,563,884 | 10/1996 | Fimoff et al. | 370/84 |
| 5,583,868 | 12/1996 | Rashid et al. | 370/394 |
| 5,668,948 | 9/1997 | Belknap et al. | 395/200.61 |
| 5,938,734 | 8/1999 | Yao et al. | 709/232 |
| 5,940,738 | 8/1999 | Rao | 455/4.2 |
| 5,949,411 | 9/1999 | Doerr et al. | 345/327 |

FOREIGN PATENT DOCUMENTS

| | | |
|---|---|---|
| 0 695 062 A2 | 1/1996 | European Pat. Off. |
| WO 97/25817 | 7/1997 | WIPO |

OTHER PUBLICATIONS

Kumar et al., "A High Performance Video Server for Broadband Network Environment", Jan. 1996, SPIE, vol. 2667, pp. 410–421.

*Primary Examiner*—Le Hien Luu
*Attorney, Agent, or Firm*—Lee & Hayes, PLLC

[57] ABSTRACT

A continuous media file server system has a controller connected to multiple data servers. Each data server supports at least one storage disk. Data files are distributed across the data servers so that data blocks of the data files are stored on each of the storage disks. The data files have different data transmission rates at which they are served over a network to clients in the form of data streams. A scheduling unit maintains a network schedule that provides a relative ordering of transmission times of requested data streams. The transmission times indicate when the data servers are to transmit corresponding data blocks of the requested data files over the network to stream the data to clients. The block play times for all data files have a fixed duration, with the size of the data blocks from data file to data file varying according to the data transmission rates of the files. When a transmission time for a data file block approaches, the scheduling unit instructs the appropriate data server to read a data block for that data file from the disk prior to the transmission time in the network schedule. In this manner, disk reads are scheduled implicitly according to the network schedule. The data is temporarily stored in buffer memory, and later transmitted over the network. When a request for a new data stream is received, the scheduling unit evaluates whether the new data stream can be inserted into the network schedule without overburdening the data servers' ability to serve the existing data streams on the network schedule.

49 Claims, 19 Drawing Sheets

| Time | Start /End | Type | Stream | Bandwidth (Mb/s) | | |
|---|---|---|---|---|---|---|
| | | | | No Fail | Fail Mode 1 | Fail Mode 2 |
| 0.0 | Start | Primary | 6 | 4 | 7 | 5 |
| 0.0 | Start | 2 | 8 | 4 | 7 | 5 |
| 0.0 | Start | 1 | 2 | 4 | 7 | 5 |
| 0.5 | End | 2 | 8 | 4 | 5 | 6 |
| 0.5 | End | 1 | 2 | 4 | 5 | 6 |
| 0.5 | Start | 2 | 5 | 4 | 5 | 6 |
| 0.5 | Start | 1 | 8 | 4 | 5 | 6 |

CONTINUOUS MEDIA FILE SERVER SYSTEM AND METHOD FOR SCHEDULING NETWORK RESOURCES TO PLAY MULTIPLE FILES HAVING DIFFERENT DATA TRANSMISSION RATES

TECHNICAL FIELD

This invention relates to continuous media file server systems that simultaneously serve multiple data streams to a large number of clients. More particularly, this invention relates to methods for scheduling network resources within a continuous media file server system to accommodate simultaneous distribution of multiple data streams that have different data transmission rates.

BACKGROUND

A continuous media file server system is designed to serve continuous data streams, such as audio and video data files, to multiple clients. As an example, a file server system might simultaneously supply multiple digital data streams, each in the 1–10 megabits-per-second (Mb/s) range, to thousands of clients.

General Architecture

FIG. 1 shows a continuous media file server system 20 developed by Microsoft Corporation. The file server system is a distributed, scalable, and fault-tolerant server that can serve many continuous data streams simultaneously to a large number of clients. The file server system 20 has a central controller 22 connected to multiple data servers 24(1), 24(2), 24(3), . . . , 24(K) via a low bandwidth control network 26. The controller 22 receives requests from clients, such as requests for starting and stopping a particular data file. The controller 22 is responsible for initiating delivery of streaming content to the requesting clients, including such tasks as locating the data server that holds the first block of data in the requested data file. The controller and data servers can be implemented, for example, as general purpose computers.

Each data server 24 supports at least one storage disk, as represented by storage disks 28(1), 28(2), . . . , 28(M) connected to data server 24(1). The disks 28 are attached to their respective data server 24 via one or more buses 30 (e.g., SCSI, Fiber Channel, EIDE, etc.). The number and configuration of storage disks is flexible, but within a given file server 20, all data servers 24 support the same number of storage disks 28. The storage disks can store large amounts of digital data, with example disk capacities of many Gigabytes. The storage capacity of the entire media file server 20 consists of the usable storage space on the storage disks. An operator can change the storage capacity of the file server by adding or removing one or more storage disks to or from each data server, or adding or removing one or more of the data servers to which the disks are connected.

The data servers 24 are connected to a high-speed network switch 32 via network interfaces 34 (e.g., network card). The network switch 32 takes the data segments read from the storage disks, orders them into a continuous stream, and distributes the streams over a network to the clients. The network switch 32 also provides high bandwidth, parallel communication between the data servers 24. Additionally, the controller 22 may be connected to the data servers 24 through the network switch 32, as opposed to a separate control network 26. As an example, the network switch 32 can be implemented using fiber optics and ATM (Asynchronous Transfer Mode) switches.

Each data server 24 contains a memory buffer, as represented by buffer 36 in data server 24(1). The buffer 36 temporarily stores data that is read from the disks 28(1)–28(M) and is to be output to the network switch 32.

The continuous media file server system 20 can be implemented in different contexts. For instance, the file server system 20 might function as a head end server in an interactive television (ITV) system which serves audio and video files over a distribution network (e.g., cable, satellite, fiber optic, etc.) to subscriber homes. The file server system 20 might alternatively operate as a content provider that distributes data files over a network (e.g., Internet, LAN, etc.) to multiple client computers.

Data Striping

It is likely that some pieces of content will be more popular than others. For example, the top ten percent of movies ordered by popularity might garner 70% of the load, while the remaining 90% of the content attracts only 30% of the viewers. To avoid disproportionate use of storage disks 28 and data servers 24 (i.e., by overburdening the disks and data servers holding popular content while leaving other disk and data servers underutilized), the continuous media file server system 20 stripes all of the data files across all of the storage disks 28 and all of the data servers 24. When a client requests a data stream, all data servers 24 share in the distribution of that stream, each supplying a portion of the data stream in turn. In this way, the load is spread over all of the storage disks 28 and data servers 24 regardless of the data file's popularity.

Prior to this invention, the data streams were served at a constant data transmission bit rate. With this assumption, each data file could be broken into "blocks" of fixed temporal width. A block represented the amount of physical space allocated on a disk to hold one time unit of data, and could be expressed in terms of bytes. The temporal duration required to play the data in the block is known as a "block play time". For a data rate of 1 Mb/s, for example, the block size might be 1 Megabit and the block play time might be one second. In the conventional file server, a single block play time is established for all data files, resulting in a fixed-size data block.

FIG. 2 shows an example file server disk array 40 consisting of six data servers 0–5, each supporting two storage disks. Each disk stores data blocks, as represented by the labeled rectangles such as "A0", "A6", etc. Data files are striped across every storage disk of every server. For each data file, a starting disk is chosen to hold the first data block. For instance, the first block of data file A, designated as block "A0", is stored on disk 0 of data server 0. A server index is incremented, and the next block in the file (i.e., block "A1") is placed on disk 0 of server 1. The striping continues across the first disks of each server.

When the last server 5 is reached, the striping pattern wraps and continues with the next disks of each server. More specifically, when the server index reaches the number of servers in the system, a disk index is incremented (modulo the number of disks per server) and the server index is reset to 0. In FIG. 2, after data block A5 is placed on disk 0 of server 5, the next block in the file (i.e., block "A6") is placed on disk 1 of server 0. Block A7 is then placed on disk 1 of server 1, and so on. This process continues until all the data blocks of the video file have been assigned to disks.

The process is then repeated for each subsequent data file. Typically, the striping pattern starts the various data files on different starting disks. In FIG. 2, two data files A and B are shown. Data file A begins on disk 0 of server 0, and data file B begins on disk 0 of server 1.

The striping pattern generally prescribes that the data blocks are sequentially ordered across ordered disks, but the sequential blocks need not reside at the same physical block address on adjacent disks. For instance, the striping pattern of files A and B result in the storage of sequential blocks B3 (disk 4, server 0) and B4 (disk 5, server 0) at different physical locations on the two disks (location 3 for block B3 and location 2 for block B4). Accordingly, sequential data blocks can reside at entirely different physical block locations within the contiguous disks. The block locations in the disk array are described by file metadata that is stored either in memory or on disk. It is noted that other patterns are possible.

To play a data file, the file server system 20 serves the data blocks sequentially from the storage disks, one block at a time. The data blocks are read from each disk, stored temporarily in buffer memory 36 at the server 24, and transmitted to the network switch 32 in order. When file A is requested by a client, for example, block A0 is read from disk 0 (server 0) and transmitted via server 0 to the network switch for the duration of a block play time. Next, block A1 is read from disk 0 (server 1) and transmitted via server 1 to the network switch for the duration of a block play time. The striping arrangement enables continuous and ordered cycling of the servers (i.e., server 0, server 1, . . . , server 5, server 0, etc.), and the disks attached to the server (i.e., disk 0, disk 1, disk 0, etc.). The network switch sequences among the servers to output a continuous data stream A to the requesting client.

Declustered Mirroring

Over time, components are expected to fail. To anticipate this possibility, the file server system 20 employs a data mirroring technique in which the primary data is duplicated and the redundant copy is also maintained on the disks. The data mirroring is illustrated conceptually in FIG. 2, wherein the disks are divided in half with the upper half of the disks storing the primary data and the lower half of the disks storing redundant data.

The two copies of each file are stored on separate servers, in case an entire server or disk fails. One way of accomplishing this is to store all of the data from server 0's disks redundantly on server 1's disks, all of the data from server 1's disks redundantly on server 2's disks, and so on. However, if server 0 were to fail in this arrangement, the workload of server 1 would double because it would have to support its original distribution of video data plus the distribution of video data for server 0. If each server is configured to support twice its workload, the servers are using only half of their resources during normal operation when there are no failures in the system.

To avoid this inefficiency, each block of the redundant data is split into multiple pieces, and the pieces are distributed among the disks of multiple servers. This process is known as "declustering", and the number of pieces into which each block is split is known as the "decluster factor".

FIG. 2 shows a disk configuration with a decluster factor of two, meaning there are two redundant pieces for every primary data block. The data for server 0's disks are stored redundantly on the disks of servers 1 and 2; the data for server 1's disk are stored redundantly on disks of servers 2 and 3; and so on. With a decluster factor of two, the mirror half of the storage disks can be further conceptualized as having two regions: a first region to store the first redundant piece (i.e., X.1) and a second region to store the second redundant piece (i.e., X.2). As an example, primary data block A0 (disk 0, server 0) is split into two redundant pieces "A0.1" and "A0.2" in which the first redundant piece A0.1 is stored in region 1 of disk 0 of server 1 and the second redundant piece A0.2 is stored in region 2 of disk 0 of server 2.

If the server carrying the primary data fails, the mirrored data on the other servers is used. Suppose, for example, that server 0 fails. When it comes time to serve data block A6 (originally on disk 1, server 0), server 1 reads and outputs the first redundant piece A0.1 and server 2 reads and outputs the second redundant piece A0.2.

The declustered mirroring technique results in a more even distribution of increased workload among the operable servers in the event that one server (or disk) fails. This is because when a component fails, several other servers share the work of making up for the failed component. In our example of a small decluster factor of two, the increased burden to a data server is only fifty percent (i.e., its own workload and half of the failed server's workload), rather than a doubling of workload that would be needed in the absence of declustering. As the decluster factor increases, the additional burden shared by the non-failed servers is reduced.

Centralized Disk Scheduling

Due to the striping arrangement and disk configuration shown in FIG. 2, all servers share in the distribution of a data stream, each supplying the ordered blocks of data in turn. This shared operation requires a mechanism to determine when each server should provide data for each stream. Such a mechanism is provided by a time-ordered schedule that specifies, for each server 24, when to read each block of data from disk and when to transmit this data over the network 32.

In one prior implementation, the file server system 20 relies on a centralized scheduler that is maintained by the central controller 22 (FIG. 1). With a centralized scheduler, the controller 22 periodically sends messages to the servers 24, telling them what operations to perform in the near future. The schedule is defined to guarantee that, once streams are admitted, they can be serviced in a deterministic fashion to ensure availability of system resources when needed to distribute the streams. Thus, the schedule serves both as a description of when data is to be read and transmitted and also as an indication of resource allocation. There are three main resources that are allotted to the data streams: disk bandwidth, network bandwidth, and buffer memory.

The schedule for a single-rate file server is one of disk operations, and hence is referred to as a "disk schedule". The temporal length of the disk schedule is the block play time multiplied by the number of disks in the system. In the FIG. 2 example with 12 disks and a block play time of one second, the disk schedule has a temporal length of 12 seconds.

FIG. 3 shows a disk schedule 42 for a six-server, two-disk file system. The disk schedule 42 is divided into time slots 44, the width of which is determined by the amount of time necessary to service a single data block, a duration known as the "block service time". This time is equal to the block play time divided by the number of streams that can be supported per disk. If the stream distribution capacity of a particular instance of the file server 20 is limited by disk performance, the block service time is equal to the time to read one block of data from the disk, including both seek time and data transfer time. Alternatively, if the stream distribution capacity of a particular instance of the file server 20 is limited by some other factor, such as network performance or I/O bus bandwidth, the block service time is calculated as the block play time divided by the number of supported streams per server multiplied by the number of disks per server.

In FIG. 3, the block service time of the schedule 42 is one-half of the block play time (i.e., ½ second), indicating that each disk can support two data streams. Accordingly, each slot 44 is one-half second in duration, yielding twenty-four slots 44 in the twelve second disk schedule 42. In this example, the block service time is atypically high for ease of illustration. More typically, a disk can support between 5 and 20 data streams, depending upon the data transmission rate, resulting in a much lower block service time.

Each server's workload is kept low enough that there is sufficient remaining capacity for reading and transmitting declustered redundant blocks, in the event that a neighboring server fails. This is accomplished by increasing the block service time to allow for this additional workload. The exact factor by which this is increased depends upon the limiting resource in the system, but it is typically somewhat greater than 1/(decluster factor).

Requests for data files are assigned a slot in the schedule 42. Here, nine data streams 0–8 are presently scheduled. In theory, the disk schedule 42 determines when the disk read operations on each server are performed for each stream 0–8. In practice, disk reads are generally performed earlier than the scheduled times, although the lead time is bounded by a system configuration parameter. Network operations are not explicitly scheduled; rather, the beginning of each data transmission immediately follows the scheduled completion of the disk read.

As shown in FIG. 3, there is a pointer into the schedule 42 for each disk of each server, spaced at intervals of one block play time. The pointers are labeled in FIG. 3 as, for example, "Server 3, Disk 1" to reference the appropriate the server and disk. The pointers move to the right in this illustration, while the schedule 42 remains stationary. Every twelve seconds, each pointer winds up back where it started. At the instant shown in FIG. 3, disk 1 of server 3 is scheduled to be in progress of reading a data block for stream 5, disk 1 of server 1 is scheduled to read a block for stream 1, disk 0 of server 3 is scheduled to read a block for stream 3, and disk 0 of server 1 is scheduled to read a block for stream 4.

Each though data blocks are only being read for a fraction of the streams at any given time, data is being transmitted for all streams at all times. At the instant shown in FIG. 3, data is being transmitted for each stream from the server as indicated below:

| Stream | Server | Disk |
| --- | --- | --- |
| 0 | 4 | 0 |
| 1 | 0 | 1 |
| 2 | 5 | 1 |
| 3 | 2 | 0 |
| 4 | 0 | 0 |
| 5 | 2 | 1 |
| 6 | 3 | 0 |
| 7 | 0 | 1 |
| 8 | 2 | 0 |

In the above table, server 0 is currently transmitting stream 1, while server 5is concurrently transmitting stream 2, and so on. Notice also that while preceding servers are transmitting the data block, the next servers in order are reading the next data block from the disks. In this example, while server 0 is transmitting a block for stream 1, the next server 1 is currently reading the next block for stream 1. Server 1 will then transmit this next block following the transmission of the current block by server 0.

As time progresses, the controller 22 advances the pointers through the schedule 42, leading the actual value of time by some amount that is determined by the system configuration parameter. This lead allows sufficient time for processing and communication, as well as for reading the data from the disk. When the pointer for a server reaches a slot that contains an entry for a stream, the controller 22 determines which block should be read for that stream, and it sends a message to the appropriate server. The message contains the information for the server to process the read and transmission, including the block to be read, the time to begin the transmission, and the destination of the stream.

When a viewer requests that a new stream be started, say stream 9, the controller 22 first determines the server and disk on which the starting block resides. The controller 22 then searches for a free slot in the disk schedule 42, beginning shortly after the pointer for the indicated server and disk, and progressing sequentially until it finds a free slot.

For example, suppose that a new stream request arrives at the instant shown in FIG. 3, and that the controller 22 determines that the starting block for new stream 9 resides on disk 1 of server 2. Furthermore, suppose that the minimum insertion lead time is equal to one block service time, i.e., one slot width. The controller begins searching for a free slot, starting at one slot width to the right of the pointer for disk 1 of server 2. This point is mid-way through a slot S1, so there is not sufficient remaining width in the slot for the stream to be inserted. The controller proceeds to the next slot S2 to the right, which is occupied by stream 1. Thus, slot S2 is not available for the new stream 9. Similarly, the next slot S3 is occupied by stream 7, so the new stream 9 is inserted to the right of this slot, at slot S4. The viewer experiences a stream startup delay that is proportional to the temporal distance passed in the search for a free slot, which is kept to a minimum.

Buffer Usage

When the disk read is performed, the data is transferred from the disk 28 into buffer memory 36 using direct memory access (DMA). Subsequently, the server performs a network transmission in which the data is transferred from buffer memory 36 to the network interface 34. As a result, buffer memory is required for each block from the beginning of the block read to the completion of the block transmission.

FIG. 4 shows the buffer utilization. Suppose the disk read is scheduled to read a block at time $T_1$, as shown in the time line labeled "Disk Schedule". As mentioned above, the read may begin sooner within some Max Lead Time before the scheduled read, which is set as a system parameter. Accordingly, the earliest that a disk might be read is at time $T_0$, as indicated in the time line labeled "Earliest Disk Usage."

Prior to the beginning of the disk read, no buffer memory for the stream is required. The curve in the chart labeled "Buffer Usage" is thus at zero prior to the earliest possible read time at $T_0$. Buffer memory is allocated just before the disk read occurs, (i.e., on or just before $T_0$), as indicated by the steep upward step in the buffer usage curve to some X Mbytes.

Upon conclusion of the scheduled read time (i.e., time $T_2$), the data is transmitted from the buffer memory 36 to network interface 34. The data is output during a block transmission time, as indicated by the time line labeled "Network Usage". The buffer memory is deallocated after the network transmission completes, as indicated by the steep downward step at time $T_3$.

Since there is a bounded lead between the actual disk read and the scheduled disk read, and there is a fixed lag between the scheduled disk read and the network transmission, the usage of buffer memory is completely determined by the disk schedule. Thus, a single schedule serves to allocate disk, network, and buffer usage.

U.S. Pat. No. 5,473,362, entitled "Video on Demand System Comprising Stripped (sic) Data Across Plural Storable Devices With Time Multiplex Scheduling," which was filed on Nov. 30, 1993 and issued on Dec. 5, 1995, in the names of Fitzgerald, Barrera, Bolosky, Draves, Jones, Levi, Myhrvold, Rashid and Gibson, describes the striping and scheduling aspects of the continuous media file server 20 in more detail. This patent, which is assigned to Microsoft Corporation, is incorporated by reference. In this document, the file server described in U.S. Pat. No. 5,473,362 is generally referred to as a "centralized single-rate file server system".

Distributed Disk Scheduling

The server system described above has a centralized schedule maintained at the controller 22. In a second design, the schedule is distributed among all of the data servers 24 in the system, such that each server holds a portion of the schedule but, in general, no server holds the entire schedule.

The disk schedule in the distributed system is conceptually identical to the disk schedule in the centralized system. However, the disk schedule is implemented in a very different fashion because it exists only in pieces that are distributed among the servers. Each server holds a portion of the schedule for each of its disks, wherein the schedule portions are temporally near to the schedule pointers for the server's associated disks. The length of each schedule portion dynamically varies according to several system configuration parameters, but typically is about three to four block play times long. In addition, each item of schedule information is stored on more than one server for fault tolerance purposes.

Periodically, each server sends a message to the next server in sequence, passing on some of its portions of the schedule to the next server that will need that information. This schedule propagation takes the form of messages called "viewer state records". Each viewer state record contains sufficient information for the receiving server to understand what actions the receiving server must perform for the schedule entry being passed. This information includes the destination of the stream, a file identifier, the viewer's position in the file, the temporal location in the schedule, and some bookkeeping information. For reasons of fault tolerance, viewer state records are forwarded not only to the next server in sequence but also to the server following that one, so that, in case the next server has failed, the viewer state record will not be lost. This strategy implies that duplicate viewer state records are often received, which are dealt with simply by ignoring them.

When a request to insert a new data stream is received at the controller, it notifies the data server that holds the starting block of the new stream request. The data server then evaluates its own portion of the schedule to decide whether an insertion is possible. Associated with each schedule slot in the distributed schedule is a period of time, known as an "ownership period", that leads the slot by some amount. The server whose disk points to the ownership period in the schedule is said to own the associated slot. The ownership period leads the associated slot by somewhat more than a block service time. This lead ensures that the server that schedules a new stream for a slot has sufficient time for processing and communication, as well as for reading the data from the disk.

When a server obtains ownership of a slot, the server examines the slot to determine whether the slot is available to receive the new data stream. If it is, the server assigns the stream to the slot. This assignment is performed by generating a viewer state record according to the information in the stream request. This viewer state record is treated in the same manner as a viewer state record received from a neighboring server.

U.S. patent application Ser. No. 08/684,840, entitled "Distributed Scheduling in a Multiple Data Server System," which was filed Jun. 6, 1996, in the names of Bolosky and Fitzgerald, describes a method for distributing the schedule management among the data servers 24. This application is assigned to Microsoft Corporation and is incorporated by reference. In this document, the file server described in this U.S. Patent Application is generally referred to as a "distributed single-rate file server system".

Multi-Rate Media Distribution

An assumption underlying the prior art architecture of the media file server system 20 is that all data streams have the same data rate. However, in practice, various data streams have different data rates. For example, in video data, the amount of visual information varies greatly according to the content. High-action video, such as a sporting event, requires a greater amount of information per second in comparison to low-action video, such as a talking head. In some environments, users may wish to trade off picture quality versus cost, or perhaps some clients have access to higher-definition video-display devices than others. In addition, different content or transmission standards may also dictate different data rates.

For these reasons, it is desirable to provide a continuous media file server that can play multiple data streams at different data rates. One possible implementation is to configure the file server for the highest of several data rates, thereby accepting inefficient use of disk and network bandwidth for streams of lower data rates. For systems with few low-data-rate streams relative to the number of high-data-rate streams, this approach may be acceptable. In general, it results in an excessive waste of expensive resources.

Thus, there exists a need for a scheduling mechanism that allows the file server to simultaneously supply multiple data streams of differing data transmission rates while making efficient use of disk and network resources.

SUMMARY

This invention concerns a continuous media file server system that is capable of simultaneously distributing continuous data streams at multiple data transmission rates. The continuous media file server system has multiple data servers connected to stream data files continuously over a network to multiple clients. The file server system also has a controller coupled to the data servers.

Each data server supports at least one storage disk. Data files are distributed across the data servers so that data blocks of the data files are stored on each of the storage disks. The data files are permitted to have different data transmission rates at which they are served over a network to clients. For instance, one data file might be transmitted continuously at 1 Mb/s, while another data file might be transmitted at 4 Mb/s.

The file server system has a scheduling unit to coordinate the simultaneous distribution of multiple data files. The scheduling unit maintains a network schedule that provides a relative ordering of transmission times of requested data file blocks. The transmission times indicate when the data servers are to transmit corresponding data blocks of the requested data files over the network to timely stream the data to clients. The block play times for all data files have a fixed duration, while the size of the data blocks vary from data file to data file according to the data transmission rates of the files. For example, assume the block play time is set to one second. For a data file with a transmission rate of 1 Mb/s, the block size is 1 Mb; whereas, for a data file with a transmission rate of 4 Mb/s, the block size is 4 Mb.

When the transmission time for a data file block approaches, the scheduling unit instructs the appropriate data server to read the data block for that data file prior to the transmission time indicated in the network schedule. In this manner, disk reads are scheduled implicitly according to the network schedule. No explicit disk schedules are kept. The data is temporarily stored in buffer memory at the data server, and later transmitted over the network during the scheduled transmission time.

There are a number of protocols that may be used to ensure that the data is read from the disk prior to the corresponding block play time in the network schedule. One approach is to read the block at a latest possible time prior to the corresponding block play time, with conflicting reads being resolved in favor of reading first the block with the soonest deadline. Another approach is to read the block at an earliest possible time prior to a corresponding transmission time, where "earliest possible" means the earliest time subject to buffer constraints. Still another approach is to read the block at the earliest possible time prior to a corresponding transmission time, yet constrained by a preset maximum lead time.

When a request for a new data file is received, the scheduling unit evaluates whether a stream from that new data file can be inserted into the network schedule without overburdening the data servers' ability to serve the existing streams on the network schedule. As part of this process, the scheduling unit constructs a hypothetical, partial disk schedule to determine whether there is sufficient disk bandwidth and buffer capacity available to insert the new data stream. If the partial disk schedule indicates that a new stream can be accommodated without overburdening the buffer and disk resources, and if there is sufficient network bandwidth, then the new stream is added to the network schedule. The temporary disk schedule can then be forgotten.

There are two different architectures of the file server system. One architecture utilizes a centralized scheduling unit that is implemented at the controller of the file server system. In the centralized system, the scheduling unit maintains a master network schedule and timely sends messages to the data servers instructing them when to read and transmit data blocks.

A second architecture employs a distributed scheduling unit, in which the scheduling functions are spread among the data servers. In the distributed system, each data server maintains a portion of the network schedule. No master schedule exists. The data servers read and transmit data according to their portion of the schedule. When they complete their portion, all of the data servers pass their schedules onto the next servers to execute the next portion.

BRIEF DESCRIPTION OF THE DRAWINGS

FIG. 2 shows a striping layout in which data is striped across all of the storage disks in the array.

FIG. 11 shows a data structure of the network schedule.

DETAILED DESCRIPTION

Figure 1:
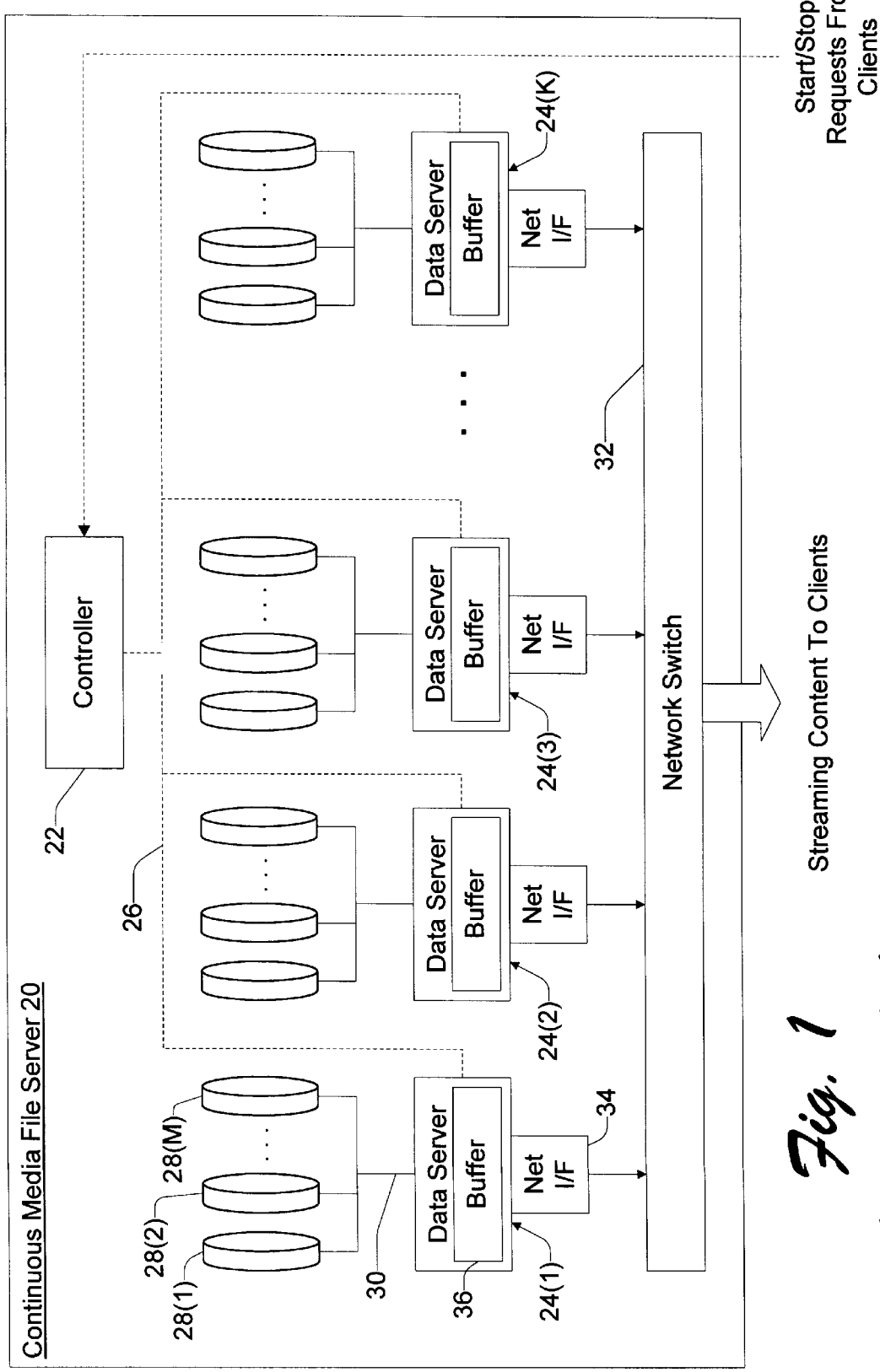
FIG. 1 is a diagrammatic illustration of a conventional, single-rate continuous media file server system.
Figure 2:
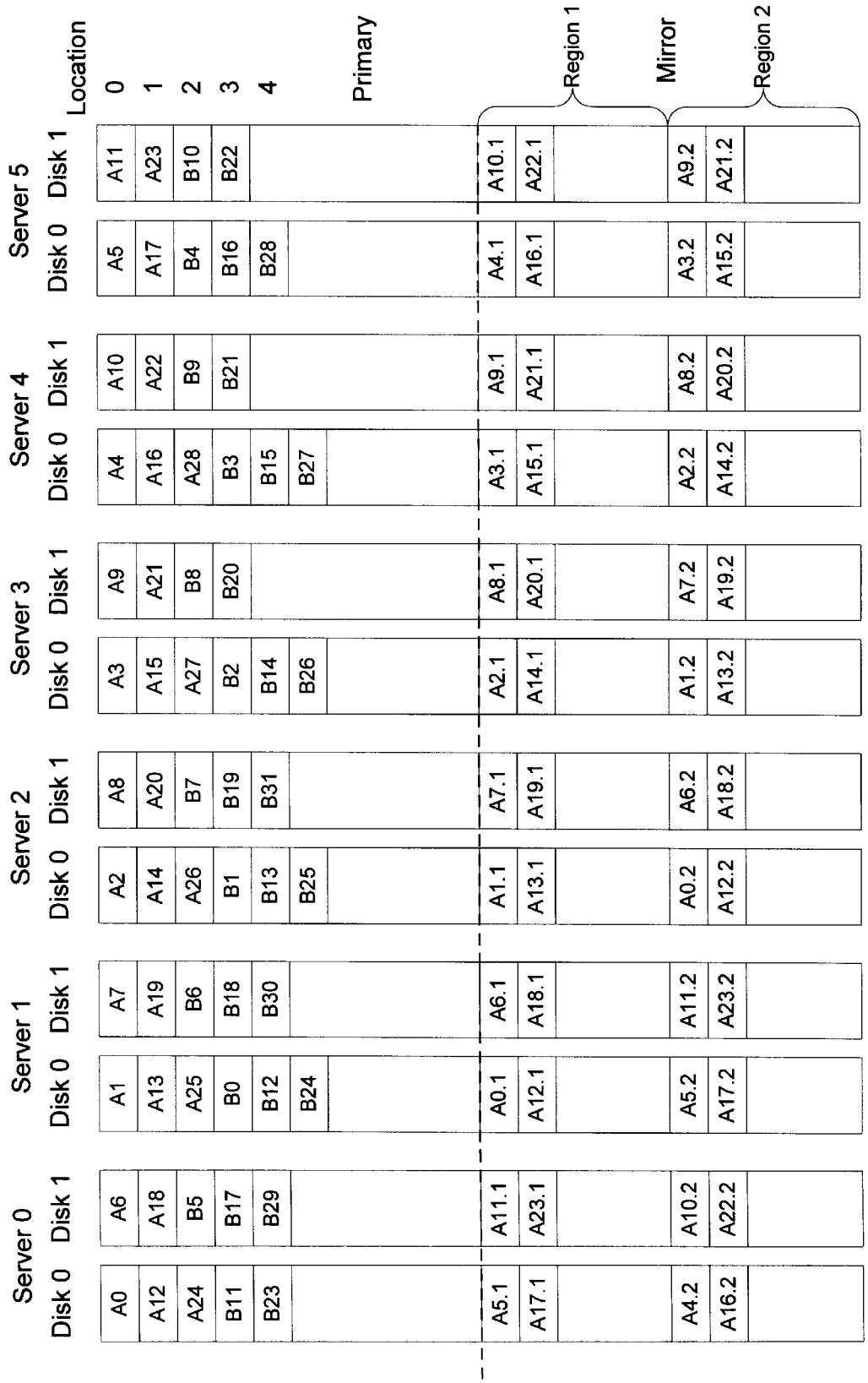
FIG. 2 is a diagrammatic illustration of a 12-disk storage disk array of the continuous media file server system.

This invention is directed to a continuous media file server system. The hardware structure of the file server system is very similar to that described in the Background with reference to FIG. 1. However, the media file server system 20 is modified to enable transmission of multiple continuous data streams at different data rates. Most of the modifications are implemented through new data structures and new software modules. This disclosure describes the aspects that differ from the single-rate file server systems described in the Background. Throughout the following discussion, the term "single-rate file server system", or similar language implying a file server that assumes a constant data transmission rate, is used to generally reference the file servers (both centralized and distributed) described in the Background. To differentiate from the "single-rate file server system", the term "multi-rate file server system", or similar language implying a file server that is capable of handling multiple media streams at different data transmission rates, is used to generally reference the file server implementations of this invention.

In particular, much of the focus in the multi-rate file server system is on a new scheduling technique that enables distribution of multi-rate media. The single-rate file server system relies only on a disk schedule, which determines not only explicitly when data is read from the disks, but also implicitly when data is sent to the network. In the multi-rate file server system, the disk schedule is replaced with a new network schedule, which dictates when data is sent to the network and implicitly handles disk reads as well.

Figure 5:
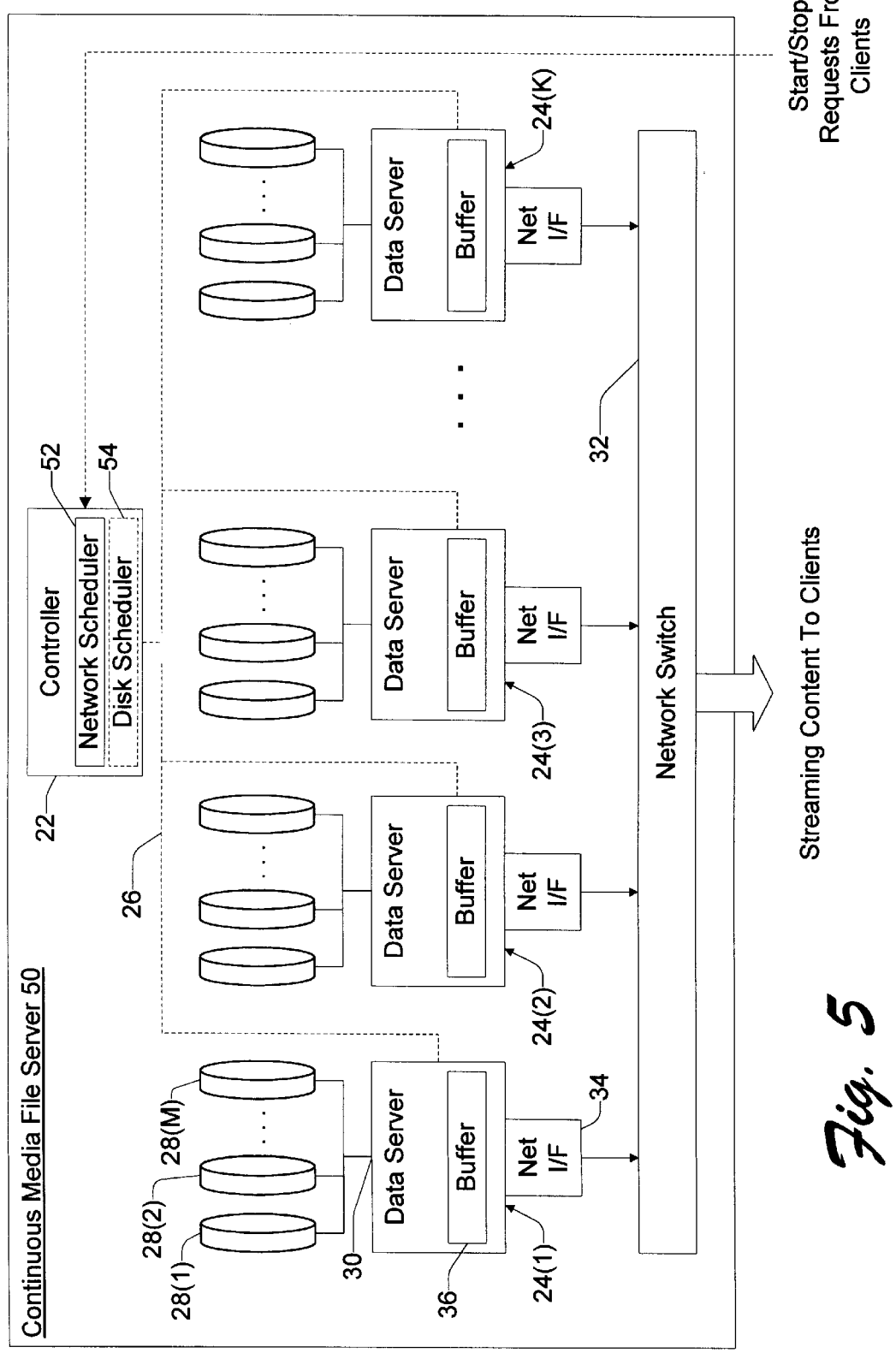
FIG. 5 is a diagrammatic illustration of a multi-rate continuous media file server system according to one implementation having a centralized scheduling mechanism.
Figure 6:
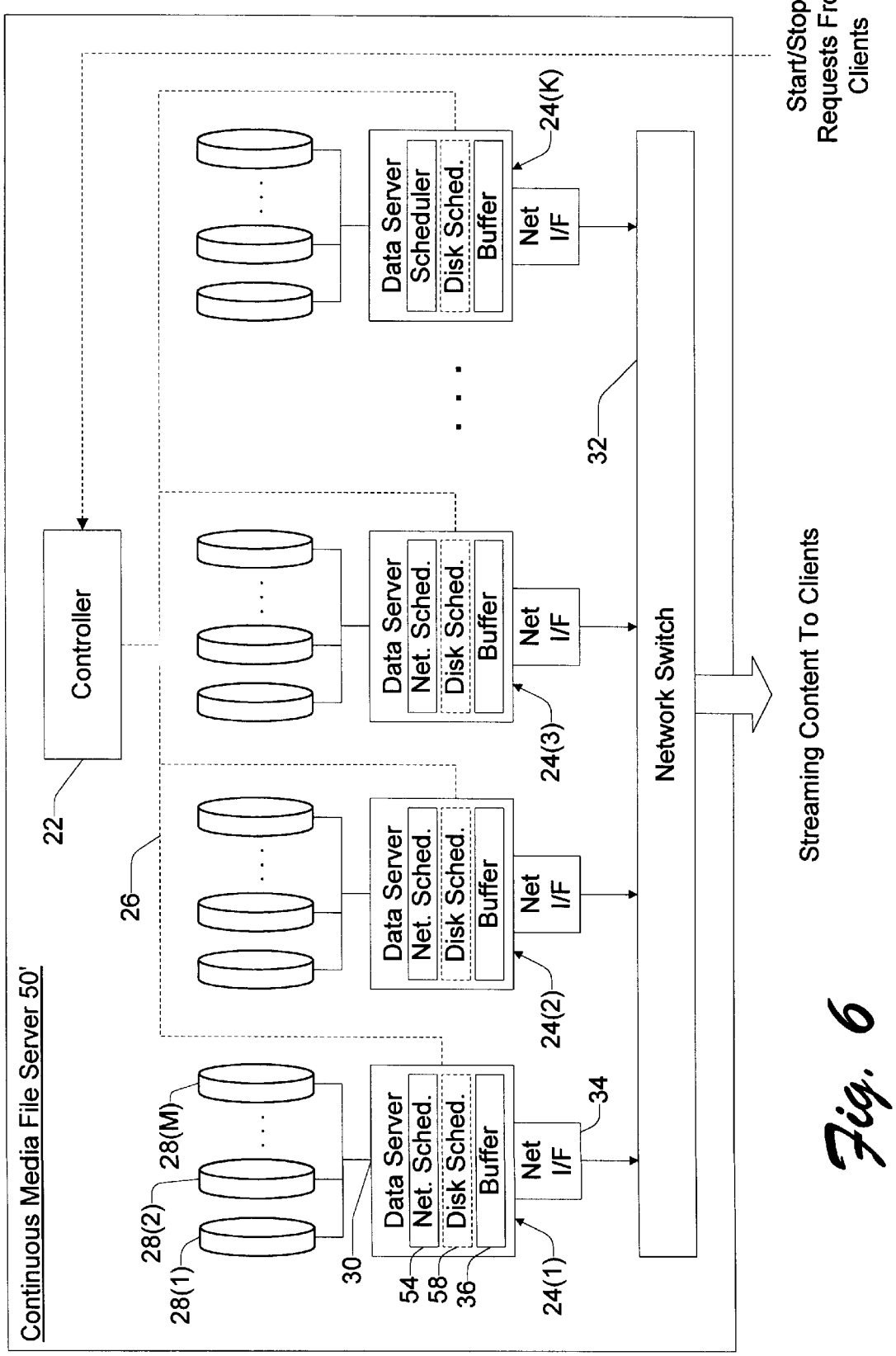
FIG. 6 is a diagrammatic illustration of a multi-rate continuous media file server system according to another implementation having a distributed scheduling mechanism.

FIGS. 5 and 6 show two implementations of a multi-rate continuous media file server system that is configured to deliver data streams at multiple data rates. The file server systems are similar to the single-rate server 20 (FIG. 1), with the same numbers referencing like components and features. However, one primary difference is that the multi-rate file server systems of FIGS. 5 and 6 maintain a network schedule for delivery of multiple data streams, having different data rates, over the network 32. The multi-rate file server system does not keep a disk schedule, as is the case for the single-rate file server system, but is capable of constructing a disk schedule on the fly when determining whether to add a new data stream to the network schedule.

There are two basic architectures for the file server system: centralized and distributed. FIG. 5 shows a centralized server system 50, wherein a network scheduler 52 and a disk scheduler 54 are implemented at the controller 22. During steady state operation, the network scheduler 52 handles both network scheduling and disk scheduling. The disk scheduler 54 occasionally executes during a request for insertion of a new data stream, and hence is illustrated as a dashed block.

FIG. 6 shows a distributed server system 50' in which the scheduling tasks are distributed among the data servers 24. Here, the network schedulers 56 and disk schedulers 58 reside at each server 24. The distributed network schedulers 56 handle both the network scheduling and any disk scheduling during steady state, and the disk schedulers 58 operate occasionally during a request to a new data stream.

In this document, the reference number 50 is used to reference generally the multi-rate file server system. Where appropriate, the numbers 50 and 50' are used to differentiate the centralized embodiment from the distributed embodiment. Prior to describing the detailed implementation, it would prove beneficial to first address a fundamental shift in underlying assumptions.

The controller and data servers can be implemented, for example, using general purpose computers. Such computers include conventional components such as one or more data processors, volatile and non-volatile primary electronic memory, secondary memory such as hard disks and floppy disks or other removable media, display devices, input devices, and other components that are well known. Each computer runs an operating system, such as the Windows NT operating system from Microsoft Corporation.

The data processors are programmed by means of instructions stored at different locations in the various computer-readable storage media of the computer. Programs are typically installed or loaded into the secondary memory of a computer. At execution, they are loaded at least partially into the computer's primary electronic memory. Aspects of the invention described herein include these and other various types of computer-readable storage media when such media contain instructions or programs for implementing the steps described below in conjunction with a microprocessor or other data processor. Aspects of the invention also include the computers themselves when programmed according to the methods and techniques described below.

Variable Block Size

Figure 3:
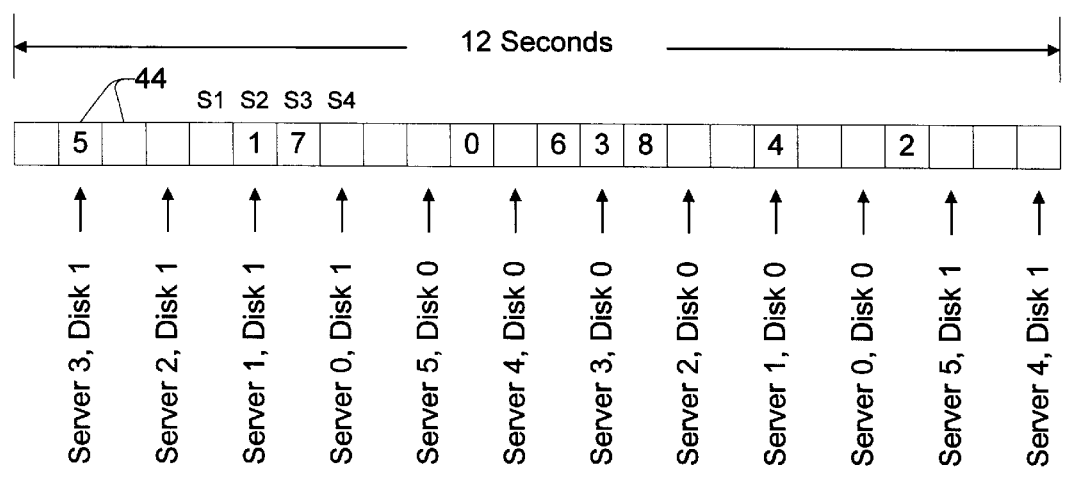
FIG. 3 shows a disk schedule used to coordinate data output among the various servers.
Figure 4:
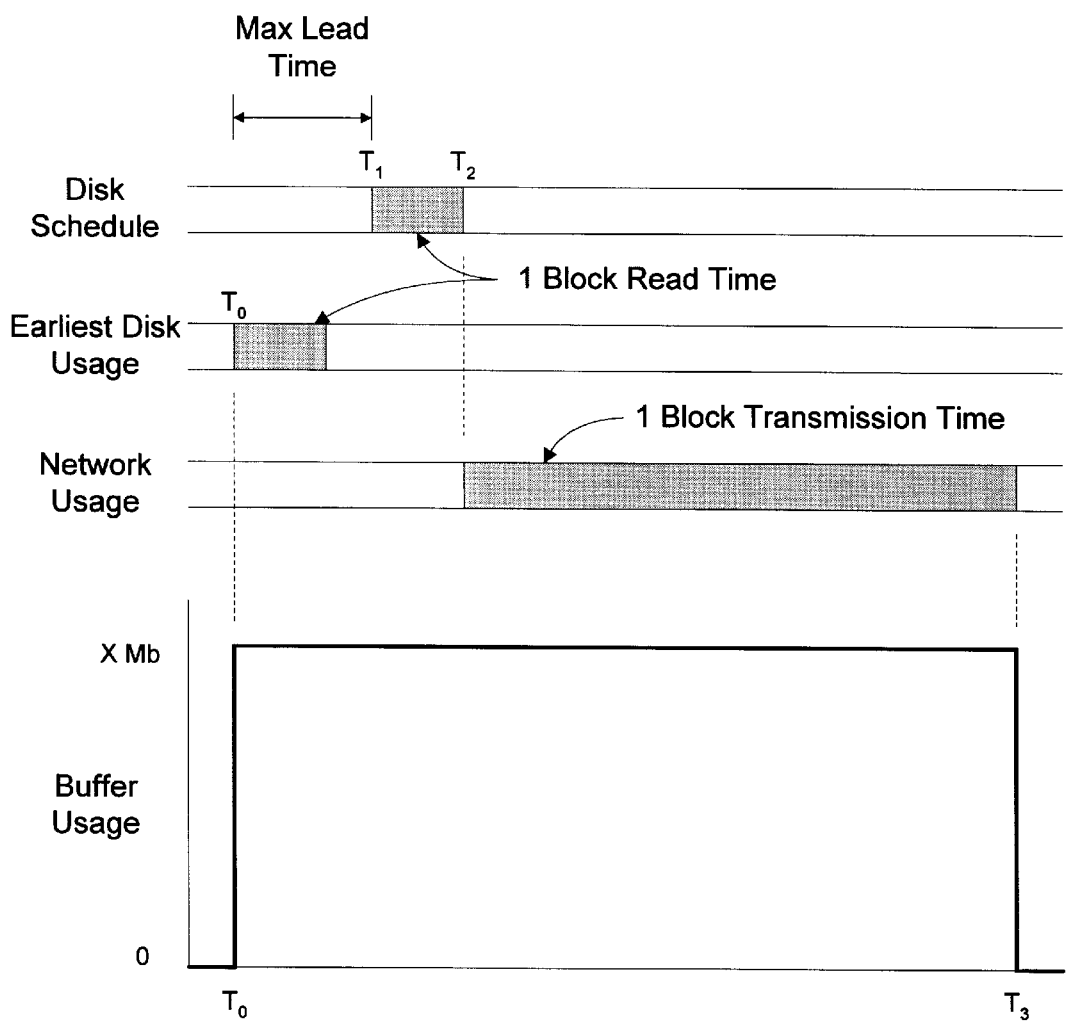
FIG. 4 is a timing diagram that illustrates a conventional technique for allocating buffer memory to accommodate disk reads and network transmissions.

In the single-rate file server system described in the Background, the underlying assumption is that data blocks stored on the disks are all the same size. That is, each block represented a fixed amount of data (e.g., one Megabyte) or a fixed time duration of data (e.g., one second). From this foundation, a single fixed block service time was established for all data streams. As a result, the disk schedule could be partitioned into time slots having equal duration block service times, as shown in FIG. 3.

Since the block play time is the same for all blocks, a constant block size implies that the data rate is the same for all files. If the data rate of any file is greater than the system configured data rate, there will not be sufficient space in the block to store the file data nor sufficient time to perform the disk reads for that file's blocks, and the system will fail.

On the other hand, if the data rate of any file is lower than the system configured data rate, the file data will fit within the system block size, disk reads will complete in their allotted time, and the system will not fail. However, the reserved disk space and read time will be excessive relative to those actually required. Furthermore, the network card will send out the stream's data either at a slower rate than allotted or for a shorter duration than the block play time. Thus, both disk and network resources will be underutilized for such low-data-rate streams, and the system will operate inefficiently.

Therefore, the underlying assumption of a fixed block size (or fixed block play time) is not valid for efficient handling of multiple data rates. Rather, according to an aspect of this invention, the multi-rate media file server treats either the block size or the block play time (or both) as variable, rather than constant. In the described implementation, the block play time remains a constant, and the block size is allowed to vary according to the actual resource requirements of each stream.

For instance, assume the block play time is set to one second. If the media has a data rate of 1 Mb/s, the corresponding block size is 1 Mb. If the data rate is 2 Mb/s, the corresponding block size increases to 2 Mb so that 2 Mb of data can be transmitted during the one second block play time. If the data rate is 3 Mb/s, the corresponding block size is 3 Mb, and so on.

Another consideration is the block service time, which is determined by the system's limiting resource, either disk bandwidth or network bandwidth. Disk bandwidth is a function of the size of each read operation, since each read comprises a constant-time seek and a linear-time data transfer. Network bandwidth is independent of the data transfer size. In the single-rate file server system, the constant block size enables a constant ratio of disk usage to network usage. Hence, only a disk schedule is used to coordinate the data output. However, if the block size is not constant, as is the case for the multi-rate file server system, the ratio of disk usage to network usage is not constant and different parts of the same schedule may have different limiting factors. Thus, a multi-rate file server system separately considers the scheduling of disk usage and network usage.

Accordingly, an implementation of this invention involves a new scheduling mechanism that assumes a variable block size. Conceptually, the scheduling mechanism can be divided into a network scheduler that schedules network usage and a disk scheduler that schedules disk usage. However, for reasons discussed below, only the network scheduler is used during steady state operation to explicitly coordinate network usage and implicitly schedule disk usage, while the disk scheduler is only used in situations where a new data stream is requested to be added to the existing network schedule. The following sections address first the network scheduling techniques, followed by the disk scheduling techniques.

Network Scheduling

The multi-rate file server system has a network scheduler to schedule network resources for concurrent delivery of multiple data streams. As shown in FIGS. 5 and 6, the network scheduler can be implemented centrally at the controller 22 (FIG. 5) or distributed among the data servers 24 (FIG. 6). The network scheduler is implemented in software, firmware, or a combination of software and hardware. For purposes of continuing discussion, this document refers generally to the scheduling mechanism as the "network scheduler", regardless of where it is implemented. Where appropriate, the modifiers "centralized" and "distributed" are used in conjunction with "network scheduler" to point out specific aspects pertaining to a particular implementation. The centralized network scheduler and distributed network scheduler are separately discussed below in more detail.

The network scheduler creates a network schedule that the file server system follows to efficiently deliver plural multi-rate data streams. The network schedule has a temporal length equal to the block play time multiplied by the number of servers in the system. For a six-server system and a block play time of one second, the schedule length is six seconds.

Figure 7:
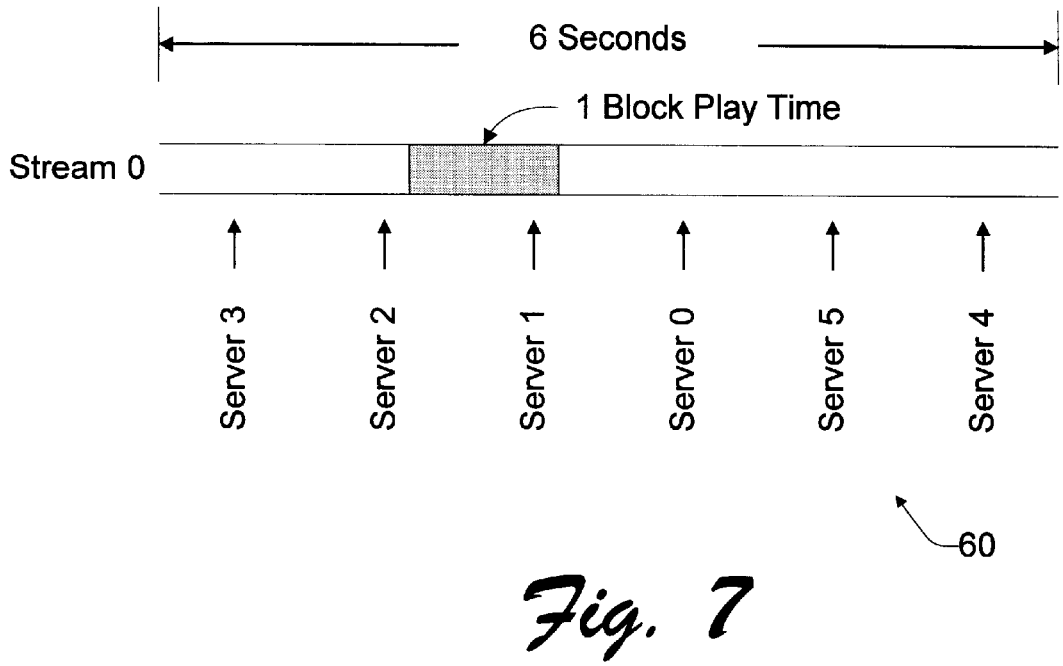
FIGS. 7 and 8 show a network schedule for a single stream, taken at two different instants in time.
Figure 8:
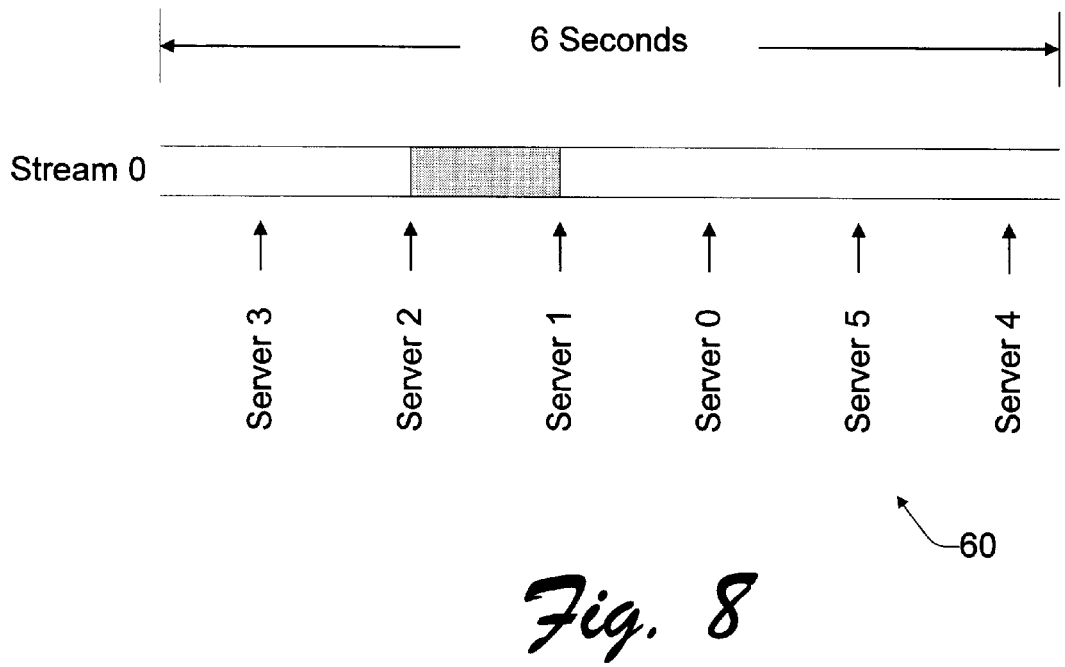

FIGS. 7 and 8 show a simple network schedule 60 containing a single data stream 0, taken at two different instants in time. The rectangular block in the schedule represents one block play time for stream 0. The network schedule 60 determines when each server transmits data over the network for each stream. The servers' pointers into the network schedule move to the right as the network schedule remains stationary. At the instant shown in FIG. 7, server 1 is about three-quarters of the way through transmitting a data block for stream 0. At the instant shown in FIG. 8 (approximately 0.25 seconds later than FIG. 7), server 1 is finishing transmission of its data block for stream 0 and server 2 is just beginning transmission of its data block for stream 0. The servers continue to walk around the network schedule 60 in a cyclical fashion. Assuming no change is made to the schedule by removing the stream, each server will transmit a data block for stream 0 every six seconds.

In addition to describing when to begin the transmission of data blocks, the network schedule 60 describes the instantaneous load on the servers' network cards 34. At the instant of FIG. 7, server 1's network card is transmitting at the data rate of the stream 0, and all other network cards are idle.

Figure 9:
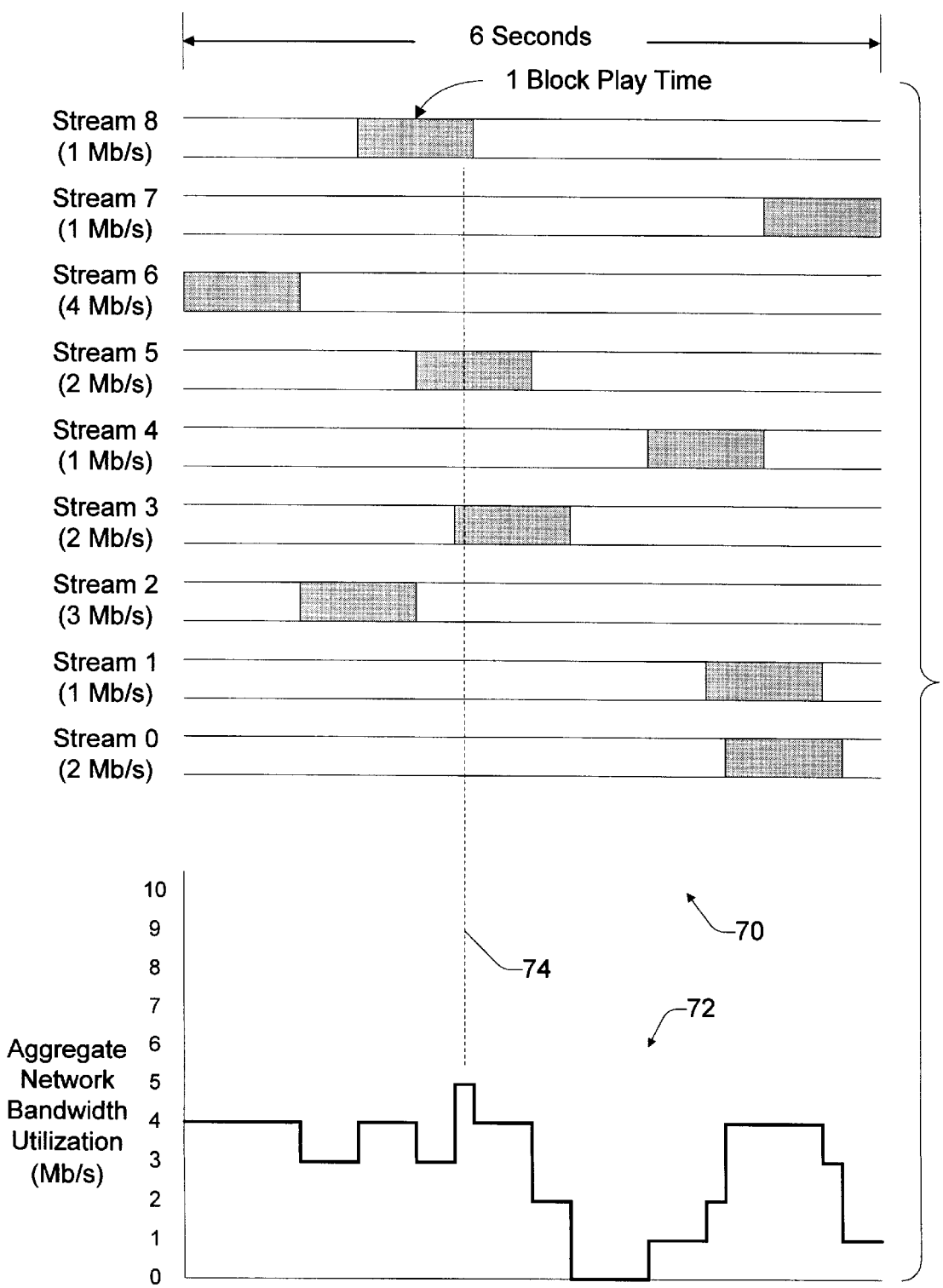
FIG. 9 shows a network schedule for nine data streams.

FIG. 9 shows a more involved example of a network schedule 70 containing nine data streams 0–8. The network schedule 70 has a six-second duration. Each block in the schedule 70 represents one block play time for the associated data stream. The location of the blocks indicates each stream's temporal position in the network schedule 70. As noted above, the block play time is held constant, while the block size (i.e., the amount of data contained in each block) is allowed to vary.

The data streams 0–8 have one of four different data rates, ranging from 1 to 4 Mb/s, as indicated in parentheses beneath the stream number. The scheduled data streams are transferred out through the servers' network cards 34 during the ordered block play times in network schedule 70. In this example, each server network card 34 has a maximum data rate of 10 Mb/s.

FIG. 9 also shows a chart 72 of the aggregate network bandwidth utilization of each server network card. The chart 72 plots the network utilization at each point in the network schedule during transmission of the data streams. The network utilization curve is obtained by drawing a vertical line through the network schedule 70 at the instant in question and summing the bandwidths of all streams that the line passes through. For example, at vertical line 74, the bandwidth used to output stream 3 (2 Mb/s), stream 5 (2 Mb/s), and stream 8 (1 Mb/s) simultaneously from the same server is 5 Mb/s. For this schedule, 5 Mb/s is the worst-case instantaneous bandwidth requirement.

As represented in FIG. 9, the system's network scheduler ensures that there are sufficient network resources to output the multiple streams at multiple data rates. Here, the network scheduler schedules eight data streams of different data rates in a manner that avoids over-utilization of the network bandwidth. The network schedule 70 in FIG. 9, however, does not take into account component failure. When a component fails, the load on some of the non-failed servers increases, as the work of the failed server is distributed amongst some of its neighbors. The network scheduler takes into account this additional network load when scheduling data streams and deciding when to admit a new stream into the schedule.

Figure 10:
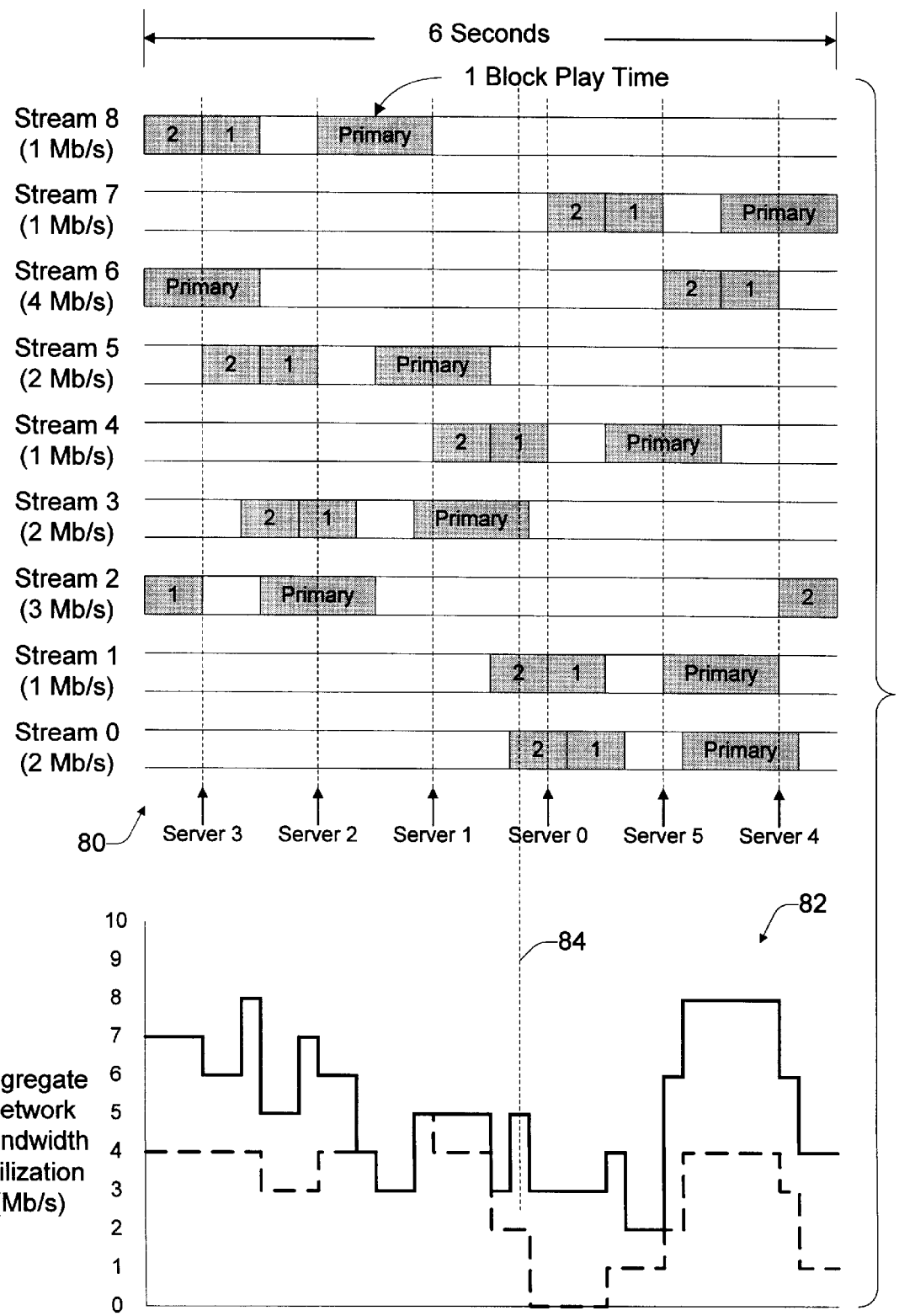
FIG. 10 shows the network schedule of FIG. 9, with the addition of scheduling when redundant data is to be read in the event of a server failure.

FIG. 10 shows a network schedule 80 that is identical to schedule 70 (FIG. 9) in terms of temporal location of primary block play times, but also includes the temporal location of the declustered secondary transmissions for each of the eight streams. The network schedule 80 assumes a decluster factor of two. Also depicted are the pointer locations into schedule 80 for each server 0–5 at an arbitrary point in time.

Each data stream contains its primary block play time (labeled "primary") and two secondary one-half block play times (labeled "1" or "2") that represent the playing of the redundant data in the event the primary data cannot be played due to component failure. The secondary play times are scheduled so that the appropriate neighboring server will play, in the event of failure to the primary server, the appropriate redundant piece that replicates the primary data that is being played by the primary server.

For example, consider a scenario in which server 1 fails. At the instant shown in FIG. 10, server 1 should be transmitting near the first-quarter of stream 3 and beginning the last half of stream 5. However, server 1 cannot supply the primary data of streams 3 and 5 because it has failed. According to the disk striping layout, the first redundant piece is stored on neighboring server 2 and the second redundant piece is stored on neighboring server 3. Thus, server 2 transmits the first redundant piece of stream 3 from its redundant copy, and server 3 transmits the second redundant piece of stream 5 from its redundant copy. More generally, servers 2 and 3 will transmit the first and second halves, respectively, of any block for server 1.

The network scheduler considers the network load of both primary and secondary transmissions when making schedule decisions, such as deciding when to admit a new stream into the schedule. The network scheduler ensures that the instantaneous network bandwidth never exceeds the maximum data rate of a server's network card, for all failure modes.

FIG. 10 shows a chart 82 for the aggregate network bandwidth utilization of each server network card at each point in the schedule. The dashed curve represents utilization in a non-failed mode, and is identical to that shown in FIG. 9. The solid curve indicates the increase in bandwidth requirement over non-failed operation to compensate for a failed state. To compute a maximum bandwidth needed to support the network schedule in a failed state, the network scheduler sums all of the primaries together with each of the secondary class (i.e., either redundant pieces "1" or "2"), taking the highest total as the maximum bandwidth. This is because at any one time there will be at most one failed server within any group of servers that hold mirror data for each other.

At point 84, for example, the network scheduler sums the primary stream 3(2 Mb/s) with the first secondary class (i.e., redundant piece 1 for stream 4 (1 Mb/s)) to yield 3 Mb/s. The network scheduler also sums the primary stream 3 (2 Mb/s) with the second secondary class (i.e., redundant piece 2 for stream 1 (1 Mb/s) and redundant piece 2 of stream 0 (2 Mb/s)) to yield 5 Mb/s. The highest total of these two summations is 5 Mb/s, which is this case for fail mode 2. Notice that the worst-case instantaneous bandwidth requirement in chart 82 has increased to 8 Mb/s, which is above the worst-case bandwidth requirement of 5 Mb/s for the non-failed mode.

One potential problem in the network schedule is fragmentation. In FIG. 10, there are several points of low network utilization. However, the gaps between low points are significantly narrower than a block play time, and therefore the gaps cannot be filled with a primary stream transmission. If these gaps in network utilization were narrower than shown, they could not even be filled by transmissions of declustered secondary data. Fragmentation can be eliminated by restricting the start of primary transmissions to integral multiples of the block play time. But, adding restrictions on where streams can be located increases the mean latency of starting a new stream, a condition that should be avoided or mitigated where possible. On the other hand, having no such restrictions can greatly increase fragmentation, decreasing the maximum number of streams that the schedule can hold simultaneously.

A suitable compromise is to restrict the starting times to integral multiples of the block play time divided by the decluster factor. This restriction prevents gaps in the schedule that are too narrow to admit a declustered secondary transmission. In this example, with a block play time of one second and a decluster factor of two, streams should be started on multiples of a half second.

For purposes of determining when to admit a new stream, the solid curve in chart 82 (FIG. 10) is considered to be the maximum network bandwidth at that instant over the schedules of all failure modes. Thus, the network scheduler analyzes the maximum instantaneous network bandwidth usage to determine whether a new stream, at a new data rate, will cause the bandwidth usage to exceed available resources of 10 Mb/s at any point in the schedule 80.

Centralized Network Scheduler

FIG. 5 shows the continuous media file server system 50 with a centralized network scheduler 52 implemented at the controller 22. According to one implementation, the centralized network scheduler 52 is implemented in software that runs at the controller computer. The centralized network scheduler 52 sends out messages that contain all the necessary information for the data servers 24 to process the read and transmission of a block for a stream, including the block to be read, the time to begin the transmission, and the destination of the stream. The messages also contain block size information, since the block size varies depending upon the data rate. Each server responds to the scheduler's messages by performing the appropriate actions.

To know when to send out the messages, the centralized network scheduler 52 maintains a data structure for the network schedule. The network schedule is stored as a set of events, each of which is the start or the end of a network transmission. Events are stored both for primary block transmissions and for declustered secondary block transmissions, and each one contains the following data:

The time of the event

Whether the event is the start or end of a transmission

The type of the transmission: primary or declustered secondary

A pointer to a record containing information about the stream, including:

Which file is playing

The position in the file

The destination (viewer) of the stream

The bandwidth of the stream

An array of the new aggregate bandwidth, for each failure mode

The events are stored in a time-ordered, circular, doubly linked list. When two events have the same time index, they are further ordered according to the rule that end events precede contemporaneous start events.

FIG. 11 shows a table 90 with a portion of the event list for the network schedule 80 of FIG. 10. Each row in table 90 is an element in the list, and each event is linked both to the preceding event and to the subsequent event. As an example, the first event in table 90 represents the start of a network transmission for the primary block of data stream 6, shown at the left edge of FIG. 10. The start time for this event is 0.0 and the pointer points to a record containing information about stream 6. The minimum bandwidth requirement to transfer the primary block of stream 6 is 4 Mb/s (see dashed curve in FIG. 10).

The next two events pertain to the start times of secondary pieces, including redundant piece 2 of stream 8 and redundant piece 1 of stream 2. At this point in the schedule, the worst of the two possible failure modes is mode 1, transmitting redundant piece 1 of stream 2 along with the primary of stream 6 for a total of 7 Mb/s (see solid curve in FIG. 10).

In addition to the data fields explicitly shown in table 90, each event structure contains two other fields that are implied by the ordering of the events. These fields are pointers that point to time-order-adjacent events, forming the linked list in which the events are stored.

During steady-state operation, the centralized network scheduler 52 maintains a pointer into the network schedule for each server, as represented by the arrows in FIG. 10. The spacing between adjacent pointers is one block play time. As time progresses, the centralized network scheduler 52 advances the pointers through the schedule, leading the actual value of time by some amount that is determined by a system configuration parameter. The lead allows sufficient time for processing and communication, as well as for reading the data from the disk. When the pointer for a server reaches a start event that is valid for the server's current operating mode (taking into account any failed components), the centralized network scheduler 52 determines which block should be read for that stream and sends a message to the server. The messages can be batched to reduce I/O overhead to the data servers 24.

When a new stream is to be inserted into the network schedule, the network scheduler 52 searches for an acceptable position, beginning with the current time plus sufficient time to perform a disk read (modulo the schedule length). In the most basic implementation, this point can be found by beginning at time zero in the event list and scanning forward until the appropriate start time. If the linear search returns a valid insertion point that will not cause over-utilization of network bandwidth at any point in the schedule, the network scheduler 52 will allow an insertion of a new data stream (assuming sufficient disk and buffer memory resources are available, which is discussed in the sections below).

The linear search may not, however, be the most effective way to locate a suitable insertion point. The time taken by this approach increases linearly with the number of active streams, so this method is inefficient for a significant number of streams.

According to another implementation, the network scheduler maintains the events in a second data structure that enables the network scheduler 52 to search more effectively for an insertion point. One suitable search structure is a time-ordered AVL ("AVL" are the initials of the designers of this data structure, Adel'son-Vel'skii and Landis) tree. An AVL tree is a balanced binary tree, which facilitates searching, insertion, and removal of entries in worst-case time that increases logarithmically with the number of entries. An AVL tree is balanced in the sense that two sub-trees with the same parent node differ in height by at most one. Algorithms for searching within, insertion into, and removal from an AVL tree are well known in the art, and will not be described here. It is noted that other efficient search structures could have been employed instead of an AVL tree, such as an unbalanced binary tree, a red-black tree, a 2-3-4 tree, or a hash table.

Insertion of a new data stream is treated in more depth in a section titled "Insertion of New Data Stream" located toward the end of this disclosure. Insertion involves an examination of not only the network schedule, but also the disk and buffer resources at the servers.

Distributed Network Scheduler

FIG. 6 shows the multi-rate file server system 50' with a distributed network scheduler 56 implemented at each data server 24. In the illustrated implementation, the distributed network scheduler 56 is a software module that runs at each server computer. The distributed network scheduler 56 is conceptually identical to the centralized network scheduler 52 (FIG. 5). However, instead of a centralized network schedule maintained at the controller 22, each server 24 holds a portion of the schedule that is temporally near to the server's pointer into the network schedule. The length of each schedule portion is determined by system configuration parameters, but is typically about three to four block play times long. In addition, each item of schedule information is stored on more than one server, for purposes of fault tolerance.

Periodically, each server sends a message to the next server in sequence, passing on some of its portions of the network schedule to the next server that will need that information. This schedule propagation takes the form of viewer state records. Each viewer state record contains sufficient information for the receiving server to understand what actions it must perform for the incoming schedule entry. This information includes the destination of the stream, a file identifier, the viewer's position in the file, the temporal location in the schedule, and some bookkeeping information. As in the distributed single-rate file server system, viewer state records are forwarded not only to the next server in sequence but also to the server following that one, so that, in case the next server has failed, the viewer state record will not be lost.

As with the multi-rate centralized network scheduler, the multi-rate distributed network scheduler stores the partial views of the network schedule as a set of events both in a linked list and in a search structure (e.g., an AVL tree). However, the linked list is not logically circular, since each server holds only a portion of the network schedule.

Disk Scheduling

In the single-rate file server system described in the Background and in the incorporated U.S. Pat. No. 5,473,362, the disk schedule is the only schedule kept by the system. The disk schedule determines not only explicitly when data is read from the disks, but also implicitly when data is sent to the network.

In contrast, the multi-rate file server system of this invention employs a network scheduler that explicitly maintains a network schedule to determine when data is transmitted over the network. As a result, the disk schedule no longer performs the network scheduling function. Rather, the only function remaining for the disk schedule is to ensure that the data is read from the disks before it is transmitted and that buffer memory space is not exceeded, which as it turns out, is a function that no longer warrants its own schedule.

For reasons described more fully below, the multi-rate file server system does not keep a disk schedule during steady-state operation. Instead, the network schedule implicitly sets the disk schedule. As long as the data is read from the disk and into the buffer before the network scheduled transmission time, the data will be properly streamed out according to the network schedule. Hence, the multi-rate file server system can read ahead on the network schedule to schedule disk reads for timely preparation of data for transmission to a requesting client, without referring to a separate disk schedule.

Even though a disk schedule is not maintained during steady state, the disk schedule remains useful for determining whether a new data stream can be added to the network schedule. Accordingly, a complete discussion of a disk schedule and its implementation for occasional use is warranted. For sake of discussion, the multi-rate continuous media file server system 50 will be described as implementing a disk scheduler, even though it may only be invoked in situations of adding a new data stream.

The disk scheduler can be implemented centrally at the controller 22, as referenced by number 54 in FIG. 5, or distributed among the data servers 24, as referenced by number 58 in FIG. 6. The disk scheduler is implemented in software, firmware, or a combination of software and hardware.

The disk scheduler is occasionally called to create a disk schedule. The temporal length of the disk schedule is the block play time multiplied by the number of disks in the system. In the six-server, two-disks-per-server system, the disk schedule length is twelve seconds, which is twice the length of the network schedule since there are two disks per server.

Figure 12:
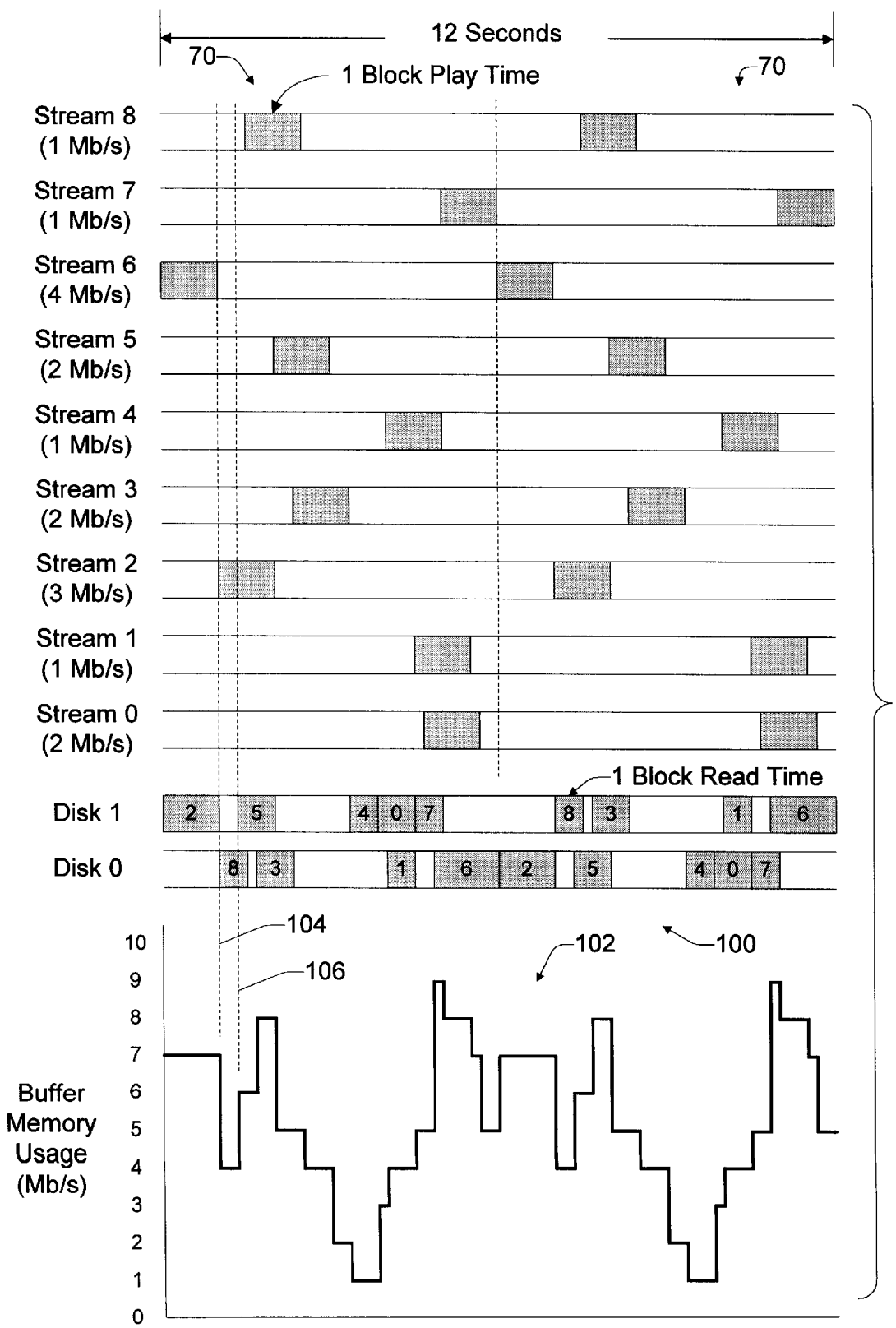
FIG. 12 shows a first disk schedule that corresponds to the network schedule of FIG. 9. The disk schedule of FIG. 12 schedules disk reads at a latest possible time prior to a corresponding block play time when the data block is to be transmitted over a network.

FIG. 12 shows an example of a disk schedule 100 for the network schedule 70 of FIG. 9. In FIG. 12, the six-second network schedule 70 is repeated to span the twelve-second disk schedule 100. The disk schedule 100 shows the disk schedule as seen by each of the two disks of each server. The six-second length of the network schedule 70 offsets the two views of the disk schedule 100 from each other.

The rectangles in the disk schedule 100 represent "block read times", which is the time needed to read the quantity of data from the disk that is subsequently used to fill one block play time. Each rectangle is numbered with the corresponding data stream to which the block read time corresponds. Notice that the block read times are not constant (i.e., not equal size in the figure). Block read times for streams of higher data rates take longer than block read times for streams of lower data rates. Here, a block read time for the 4 Mb/s stream 6 is longer than the block read time for the 1 Mb/s stream 7. However, the block read times are not proportionally longer, since the disk experiences a constant seek overhead per read operation. Each read is scheduled to complete before the corresponding transmission is scheduled to begin.

FIG. 12 also shows a chart 102 of the buffer memory used at each instant in the network and disk schedules. In this illustration, the buffer memory is allocated at the start of each disk read and held until the completion of the corresponding network transmission. For example, at the left edge of the chart, the amount of buffer memory in use is shown as 7 Mb. This is because 3 Mb are being used to store data from stream 2 that is being read from disk 1 and 4 Mb are being used to store the data from stream 6 that is being transmitted over the network.

At point 104 in the schedules, stream 6 completes its transmission, freeing 4 Mb of buffer memory; however, at that same moment stream 8 begins reading from disk 0, requiring the allocation of 1 Mb. So, the total buffer memory usage drops by 3 Mb at that point. At point 106, stream 5 begins reading from disk 1, requiring the allocation of 2 Mb, and thereby raising buffer memory usage by 2 Mb to a total of 6 Mb.

As noted above, the buffer memory is allocated at the start of each disk read and held until the completion of the corresponding network transmission. In a section below titled "Buffer Memory Management", an improved and more efficient buffer management scheme is described in which buffer memory is gradually allocated during the disk read as space is needed and gradually deallocated during the network transmission as that space is no longer needed, so as to efficiently maintain as much free buffer space as possible at all times.

In the example disk schedule 100 of FIG. 12, the data blocks are read according to a latest-possible-time protocol, wherein the data blocks are not read until the last moment before they are needed. For instance, the data block for stream 3 is read just prior to the scheduled network block play time. Two exceptions are the disk reads for the blocks of streams 0 and 4. The disk reads for blocks 0 and 4 are advanced in the disk schedule 100 so that the disk read for stream 7 can be completed before stream 7 is to begin transmission over the network.

An alternate arrangement is to keep the disk reads for streams 0 and 4 at the last possible moment and to perform the read of stream 7 before them. This approach results in less efficient use of the buffer memory. Compare the two arrangements. In the illustrated schedule, moving back the read of a 2 Mb block for stream 0 the read of a 1 Mb block for stream 4 requires less memory per second than the alternate approach of moving back the read of a 1 Mb block for stream 7. In general, maximum buffer efficiency is obtained by scheduling the order of disk reads in the order of soonest-deadline-first. Said another way, maximum buffer efficiency is obtained by scheduling the order of disk reads in the same order as network transmissions.

Figure 13:
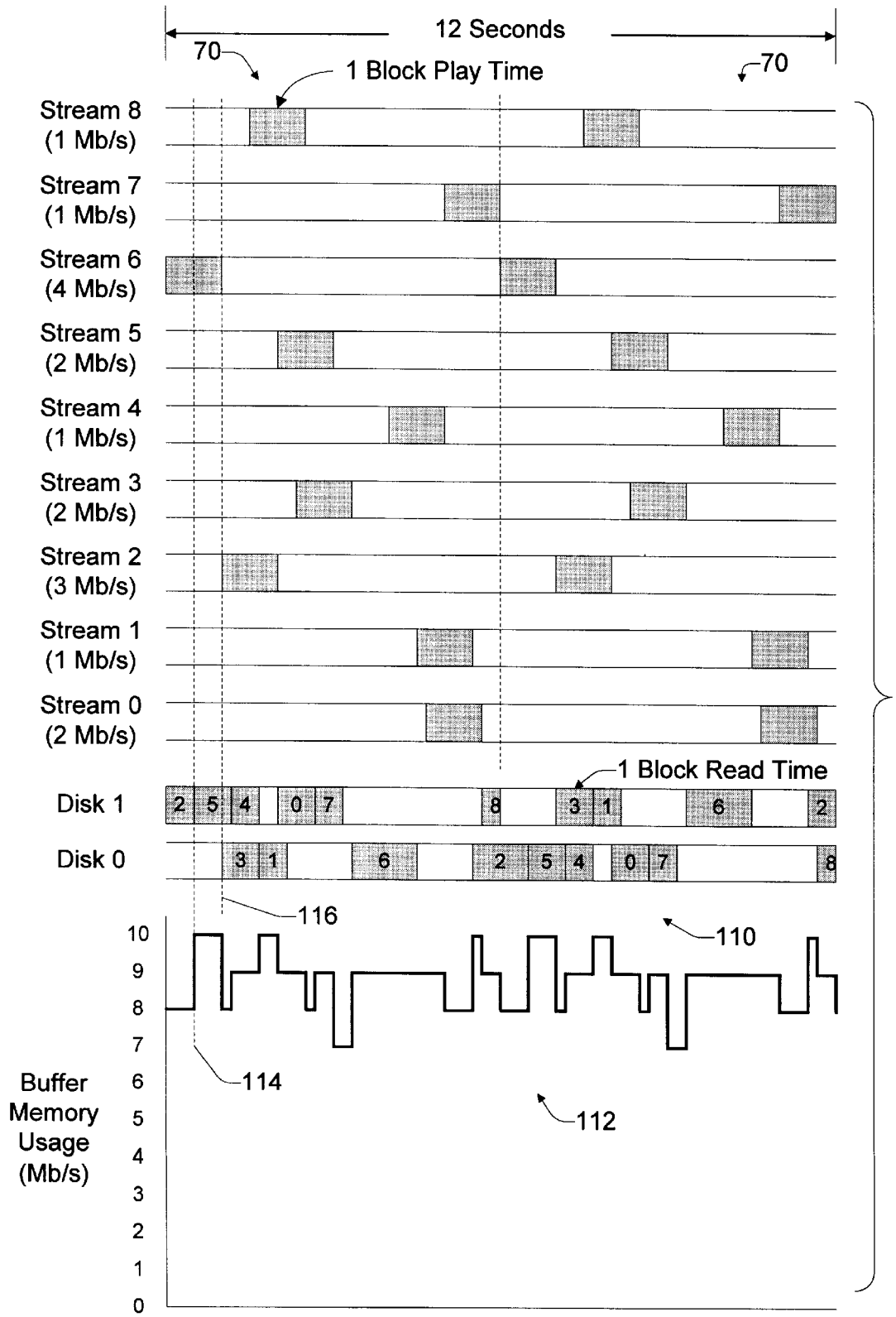
FIG. 13 shows a second disk schedule that corresponds to the network schedule of FIG. 9. The disk schedule of FIG. 13 schedules disk reads at an earliest possible time prior to a corresponding block play time when the data block is to be transmitted over a network.

FIG. 13 shows a disk schedule 110 arranged according to yet another protocol in which each disk read is scheduled for the earliest possible time, rather than the latest possible time. With this protocol, disk reads are still performed in the same order as the network transmissions; however, each read is performed as soon as sufficient buffer memory becomes available. This disk schedule 110 yields a buffer memory usage chart 112 having a curve that more closely crowds the maximum 10 Mb/s.

At point 114 in schedule 110, the total allocated buffer memory is 10 Mb. Contributing to this total are the disk read for stream 8 (1 Mb/s), the disk read for stream 2 (3 Mb/s), the network transmission of stream 6 (4 Mb/s), and the disk read of stream 5 (2 Mb/s). At point 116, stream 6 completes transmission, freeing 4 Mb of space, while the disk read for stream 3 commences, requiring the allocation of 2 Mb. This leaves the total buffer memory usage at 8 Mb.

The disk reads are arranged to enable the earliest possible read, without overwhelming the buffer memory resources. The gap between the stream 4 disk read on disk 1 and the stream 0 disk read on disk 1 cannot be closed (i.e., the stream 0 disk read cannot be performed any earlier) because the buffer memory does not have sufficient capacity to allocate the additional 2 Mb needed to store the stream 0 read.

Figure 14:
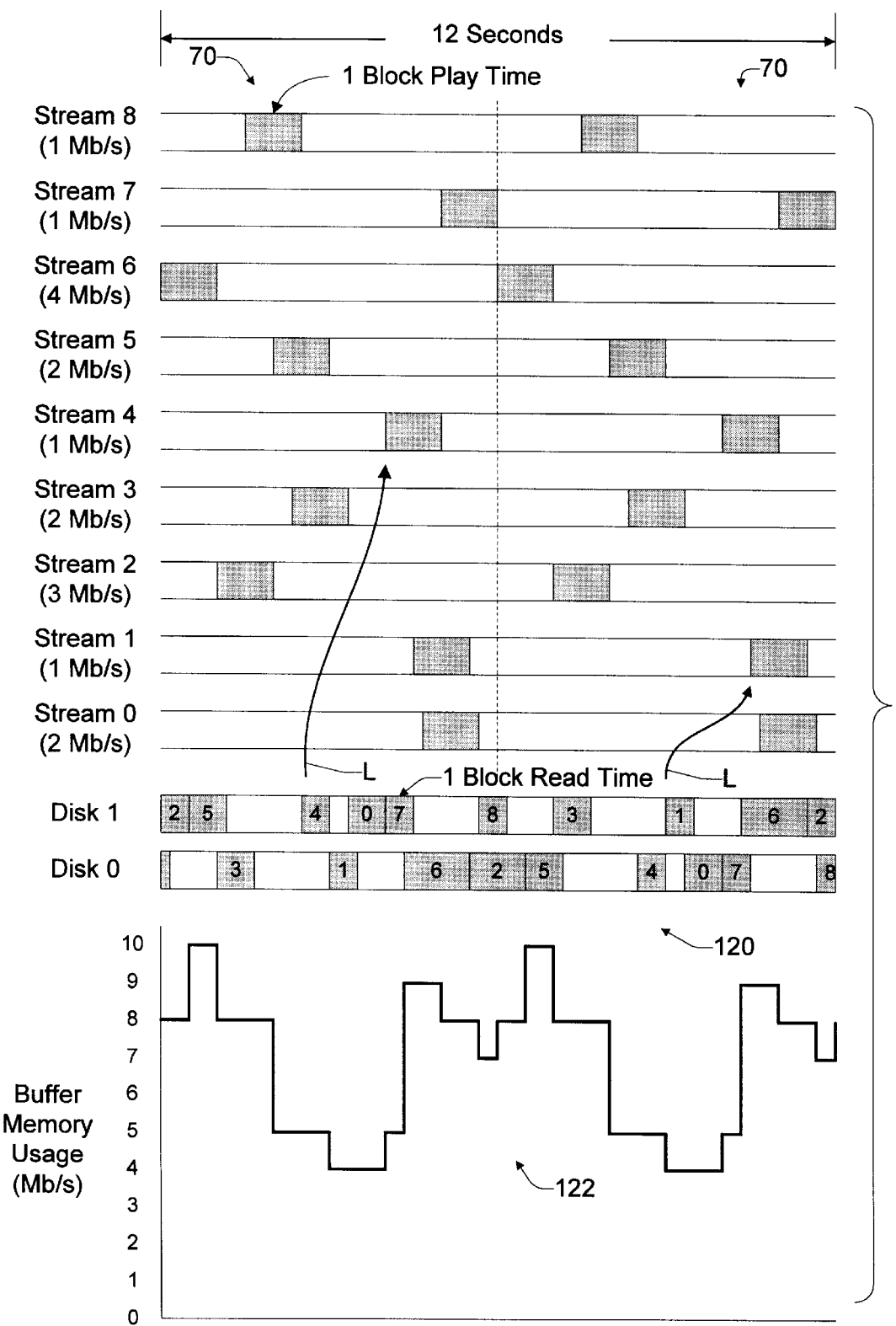
FIG. 14 shows a third disk schedule that corresponds to the network schedule of FIG. 9. The disk schedule of FIG. 14 schedules disk reads at the earliest possible time prior to a corresponding block play time, but constrained by a preset maximum lead time.

FIG. 14 shows yet another disk schedule 120 that arranges disk reads according to the earliest possible time protocol, but constrained by a maximum lead time L relative to the scheduled network transmission. That is, the maximum lead L is measured from the start of the disk read to the start of the corresponding network transmission and no disk read is performed earlier than the maximum lead time before its corresponding network transmission.

In FIG. 14, the start time of most disk reads is limited either by the maximum lead time L from its network transmission or by an earlier disk read, as illustrated for streams 1 and 4. One exception is the read for stream 3, which is limited by available buffer capacity. The disk schedule 120 produces a buffer memory usage chart 122.

Disk schedules with four different disk read protocols have been described. Each schedule ensures that disk reads occur prior to the corresponding network transmission. It is noted that other disk schedules, which meet this criterion, can be employed.

No Steady State Disk Scheduling

The disk schedules described above in FIGS. 12–14 are not used during steady-state operation of the multi-rate file server system. An interesting consequence of performing reads prior to network transmissions is that it obviates the need for maintaining a separate disk schedule, since the network schedule specifies the order and timing in which to perform the reads. In the earliest-possible-time protocol without a maximum lead time L, the multi-rate file server system examines the network schedule each time buffer space is freed to determine whether to begin a disk read and which block should be read. If a maximum lead time is used, the multi-rate file server system limits the look ahead timeframe in the network schedule to the preset lead time.

Although the multi-rate file server system does not maintain a disk schedule during steady state operation, the disk scheduler is still called upon to construct a schedule to determine whether there is sufficient disk bandwidth and buffer capacity available to insert a new stream. The multi-rate file server system 50 admits new streams only when it can verify disk bandwidth and buffer capacity by examining a local, fixed-sized portion of the network schedule. This means that new streams may be rejected when they theoretically could be admitted. In practice, rejection is rare enough that it may be ignored. On the other hand, admitting a stream when there is not sufficient disk or buffer capacity is a grave error. Accordingly, the multi-rate file server system is designed to avoid false positives, at the risk of generating occasional false negatives.

Creation of a disk schedule for purposes of examining whether to admit a new stream is described below in a section titled "Insertion of New Data Stream".

Buffer Memory Management

In FIGS. 12–14, the buffer memory for a data block is allocated from the beginning of each disk read to the end of the corresponding network transmission. At the beginning of the disk read, however, only a small portion of the buffer is required to absorb the initial data being read. The entire buffer space is not needed until the end of the disk read, at which point all of the data has been read from the disk. Similarly, once a portion of the data is transmitted over the network, the buffer memory holding the transmitted portion is no longer needed. Thus, allocating a block-size buffer from the beginning of the disk read to the end of the network transmission results in less than optimal use of the buffer memory.

According to an aspect of this invention, the data servers 24 implement a buffer memory manager that is incorporated into the buffer 36 allocates memory gradually during the disk read, as space is needed, and deallocates memory gradually during the network transmission when the space is no longer needed.

Figure 15:
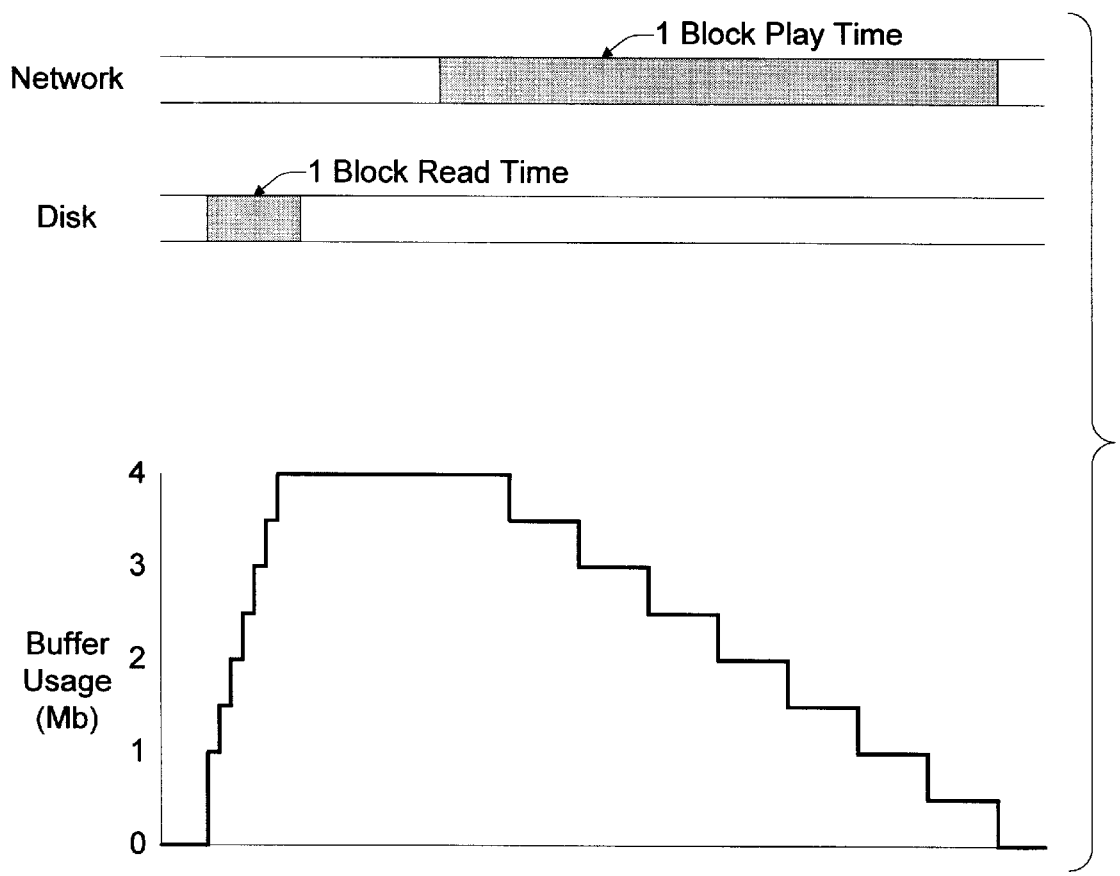
FIG. 15 is a timing diagram that illustrates a process for allocating buffer memory to accommodate disk reads and network transmissions.

FIG. 15 illustrates the buffer management scheme for a single disk read and its corresponding network transmission. In this example, suppose a 4 Mb buffer memory is constructed from eight 512 kilobit buffers. Prior to the beginning of the disk read, only two buffers are allocated (i.e., 1 Mb). Two buffers are initially allocated because two disk reads are kept outstanding, in order to take advantage of pipelining in the disk subsystem. As these two buffers are filled (e.g., during a DMA procedure from the disk controller), a third buffer is allocated. This process continues until the entire block is read. This gradual allocation results in an upward step curve shown in FIG. 15.

During network transmission, the data is transmitted out of the buffer over the network. As each 512 kb amount of data is transmitted, the buffer holding that data is deallocated. This gradual deallocation continues until all buffers have been deallocated after the conclusion of the transmission, thereby resulting in the downward step curve shown in FIG. 15.

Insertion of New Data Stream

The discussion thus far is directed to steady state operation of the multi-rate continuous media file server system. The multi-rate file server system maintains a network schedule that schedules network transmissions, and implicitly schedules data reads. The file server system reads ahead on the network schedule to perform disk reads so that the data is in the buffer for transmission prior to the scheduled network transmission time.

Now, suppose a client requests a new data stream, say stream 9, be added to the existing network schedule. In the centralized single-rate file server system described in the Background, the controller simply searches for a free slot in the disk schedule, beginning shortly after the pointer for the server and disk on which the starting block of the file resides, and progressing sequentially until it finds a free slot. This process is described in the Background with reference to FIG. 3. In the case of the distributed single-rate file server system, each data server periodically receives "ownership" of a slot. It is that server's responsibility to examine the slot and determine whether the slot is available to receive a new data stream.

Unlike the disk schedule of the single-rate file server system, the network schedule utilized in the multi-rate file server system 50 is not apportioned into time slots. Consequently, there is no corresponding process of searching for a free slot, or claiming slot ownership.

Instead, according to an aspect of this invention, the multi-rate file server system 50 examines the resources of the system to ensure they can accommodate a new data stream at its data rate. This entails determining whether there is sufficient network bandwidth, disk bandwidth, and buffer capacity available to insert a new stream. The multi-rate file server system 50 admits new streams only when it can verify network bandwidth, disk bandwidth, and buffer capacity by examining a local, fixed-sized portion of the network schedule.

To verify sufficient network bandwidth, the network scheduler examines the portion of the network schedule during which the data file blocks will be transmitted. Not only must the primary transmission time be checked, but also the transmission times for each declustered secondary transmission must be checked. Furthermore, each of these checks must be performed over all possible failure modes of the system, to ensure that there will be sufficient network bandwidth to transmit the stream regardless of failure state. This process is discussed in detail above with reference to FIG. 10.

Recall from the discussion on disk scheduling that during an insertion request, the disk scheduler is called to construct a hypothetical disk schedule to evaluate whether the disk and buffer resources can accommodate a new stream. According to one implementation, the multi-rate file server system 50 enforces a temporal limit on the extent of the new stream's effect and verifies whether a partial disk schedule can be constructed that does not exceed the buffer capacity within the defined temporal limits. If the multi-rate file server system is able to verify that a non-overloading schedule exists, because the disk scheduler is actually able to construct one, then the actual network schedule ordering will not overload the buffer capacity.

Figure 16:
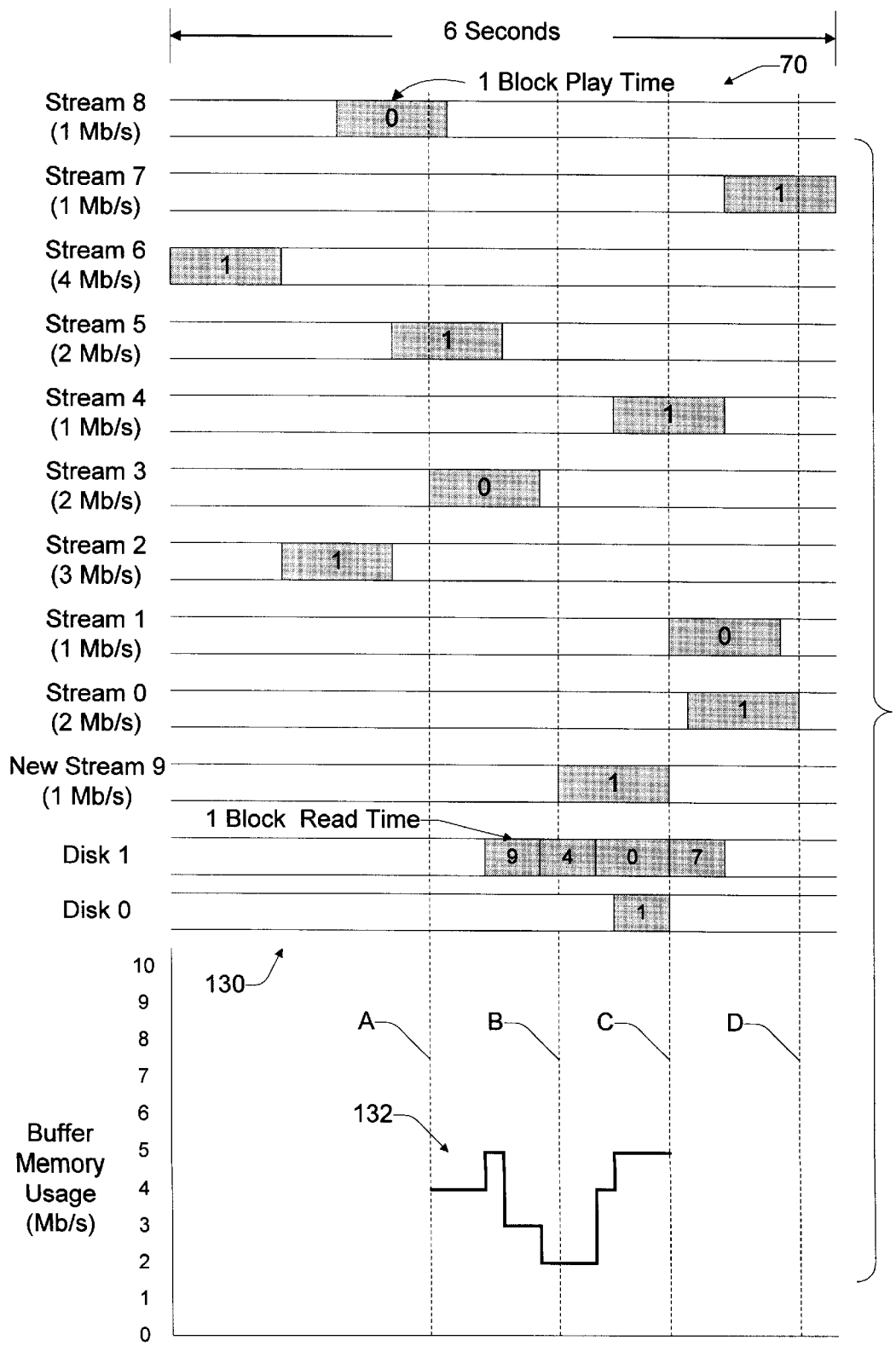
FIG. 16 shows a partial disk schedule constructed for the network schedule of FIG. 9 during evaluation of whether to add an additional data stream.

FIG. 16 illustrates how the disk scheduler constructs a hypothetical partial disk schedule 130 to determine whether a request to start new stream 9 can be approved. The existing network schedule 70 is shown in the upper portion of the figure. Notice that this is the same six-second schedule 70 that is illustrated in FIG. 9. The rectangles representing the block play time in network schedule 70 are numbered with a "0" or a "1" to indicate the disk from which the block is to be read during that portion of the schedule.

A new stream 9 is shown immediately below the existing network schedule 70. The new stream 9 has a data rate of 1 Mb/s.

The disk scheduler constructs the hypothetical disk schedule 130 on the fly. This construction process is described with additional reference to the flow diagram of FIG. 17. At step 140 in FIG. 17, the disk scheduler considers insertion of the new stream 9 at a particular time in the existing schedule 70. In the example of FIG. 16, the temporal location in the network schedule 70 that is being considered for the new stream 9 is indicated by the vertical line labeled "B". The network transmission ends one block play time later, at time point "C".

Figure 17:
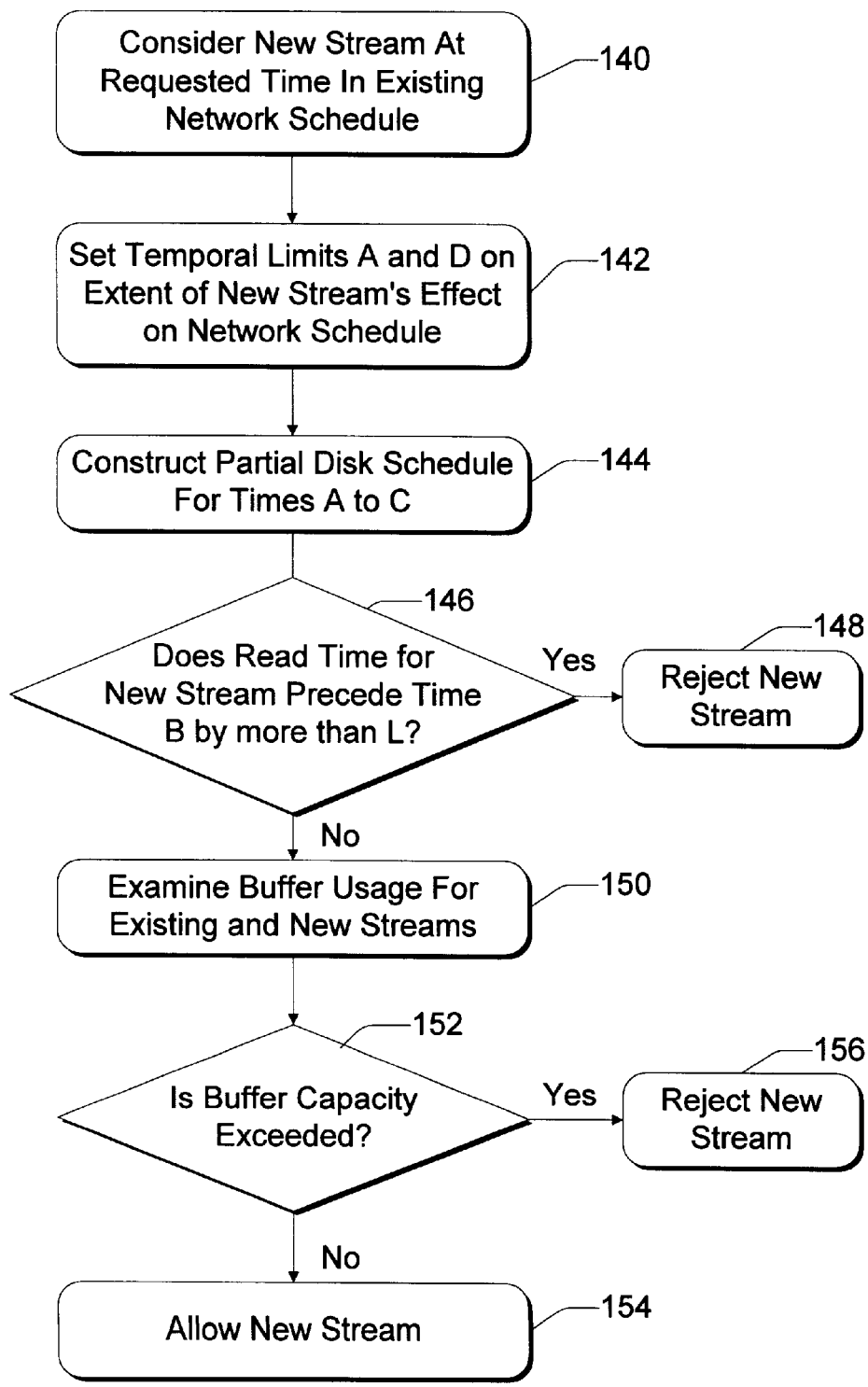
FIG. 17 is a flow diagram showing steps in a method for constructing the partial disk schedule shown in FIG. 16.

At step 142 in FIG. 17, the disk scheduler sets the temporal limits on the extent of the new stream's effect. This is done by locating a time "A" that precedes the network start by the greater of the maximum lead time L or one block play time, and locating a time "D" that immediately follows the network end by a maximum lead time L. Any stream that commences before point A ends prior to point B, and hence does not overlap with the new stream 9. As a result, the newly inserted stream has no effect on the disk and buffer usage before time A. Additionally, for any stream that begins after point D in the schedule, the disk read for that stream starts at the earliest at point C, which again does not overlap with the new stream 9. Accordingly, the constructed disk schedule need not precede point A nor come after point D. Points A and D designate the temporal limits on the extent of the new stream's effect.

At step 144 in FIG. 17, the disk scheduler constructs a local disk schedule 130 encompassing times A and C in the network schedule. The disk scheduler is configured to make the following determinations.

1. Any stream whose transmission ends before time A are ignored.
2. Any stream whose transmission ends between times A and B consumes buffer space for the duration of its transmission. In this example, streams 3 and 5 both end transmission during the time span between points A and B.
3. Any stream whose transmission starts between times A and B is assumed to consume buffer space from time A to the end of its transmission. In the FIG. 16 example, there are no such streams.
4. Any stream (including the new stream) whose transmission starts between B and D has a disk read scheduled for the latest time possible given all other such streams. That is, the disk scheduler assumes a worst case scenario by reading the data at the latest time possible (rather than the earliest time possible that is used during steady state operation) to ensure that insertion of a new stream can be accommodated. In FIG. 16, old streams 0, 1, 4, and 7 and new stream 9 all begin between the times B and D. Using the latest-time-possible protocol, the disk scheduler constructs the partial disk schedule 130 having the disk reads for streams 0, 1, 4, 7, and 9 for disks 0 and 1 arranged as shown in FIG. 16.

The rectangles in the disk schedule 130 represent one block read time, and the numbers therein refer to the corresponding stream in the network schedule 70.

At step 146 in FIG. 17, the disk scheduler considers when the read time for stream 9 occurs in the partial disk schedule 130. If the read time of the new stream 9 precedes time B by more than the maximum lead time L, the new stream 9 is rejected (step 148). Conversely, if the read time for new stream 9 does not precede time B by more than L, the disk scheduler constructs and examines a buffer memory usage curve 132 that takes into account the disk reads and network transmissions of the existing streams within the range of time A to time D and the new stream 9 (step 150 in FIG. 17). Each stream consumes buffer space from the beginning of its disk read to the end of its network transmission.

At step 152, the disk scheduler considers whether the buffer usage exceeds the available buffer capacity during the interval from A to C. If not, there is sufficient buffer capacity for the stream 9 to be serviced by the disk in the manner that is actually employed (step 154). In FIG. 16, the buffer usage never exceeds the 10 Mb/s limit and hence, the new stream 9 can be admitted. On the other hand, if buffer capacity is exceeded as a result of introducing new stream 9, the new stream 9 is rejected for the proposed scheduled time (step 156).

For simplicity, FIG. 16 does not show reads and transmissions for declustered secondary blocks. However, these blocks are also accounted for in the same fashion when determining whether a new stream can be inserted. That is, the same exercise is employed, yet beginning with the network schedule 80 in FIG. 10, and adding the new stream 9 (and secondary pieces) to that schedule, for each failure mode.

New Stream Insertion In The Centralized System

For the remaining discussion, the process of inserting a new data stream into an existing network schedule is treated separately for the centralized and distributed embodiments. The process employed for the centralized multi-rate file server system is described first, followed by the process for the distributed multi-rate file server system.

Figure 18:
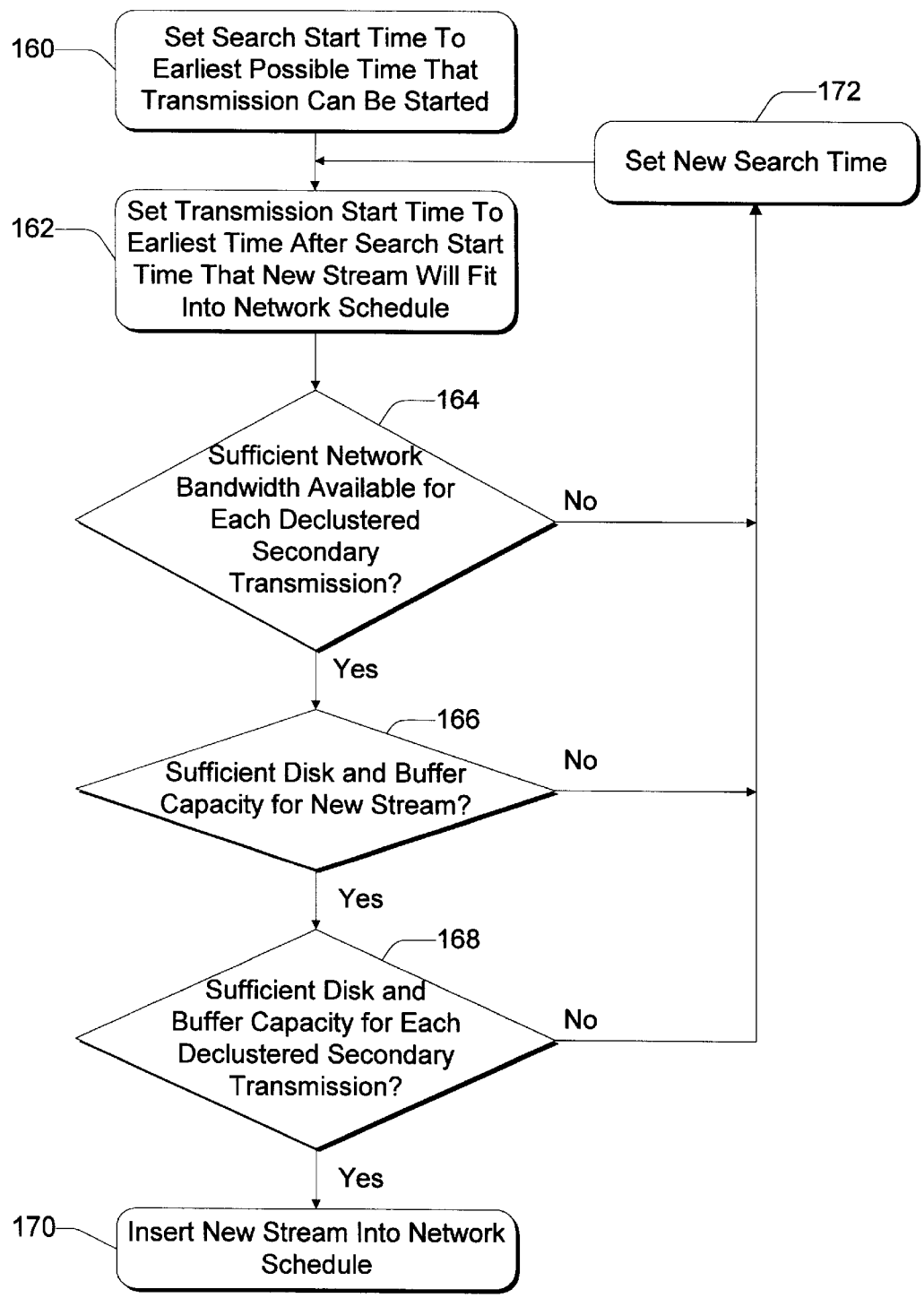
FIGS. 18 and 19 present a flow diagram showing steps in a method for inserting a new stream into the network schedule, wherein the method is implemented in the centralized file server system of FIG. 5.

FIG. 18 shows a process implemented in the centralized multi-rate file server system 50 for inserting a new data stream in response to a client request. At step 160, the centralized scheduling mechanism determines the earliest possible time that a network transmission for the new stream could be started. This time is computed as the current time, plus the time to transmit a message from the controller 22 to the first server 24(1), plus the time to perform the disk read for the new stream, plus a minimum lead time between the disk read and the network transmission. The time is rounded up to the nearest multiple of the network schedule granularity, wherein the granularity is the block play time divided by the decluster factor.

At step 162 in FIG. 18, beginning with this earliest possible start time, the centralized scheduling mechanism finds the earliest time that the new stream's primary transmission will fit in the network schedule. Generally, the network scheduler scans the network schedule linearly until it finds a period of a block play time in temporal length and aligned to the proper granularity during which there is sufficient network bandwidth for the new stream's primary transmission.

Figure 19:
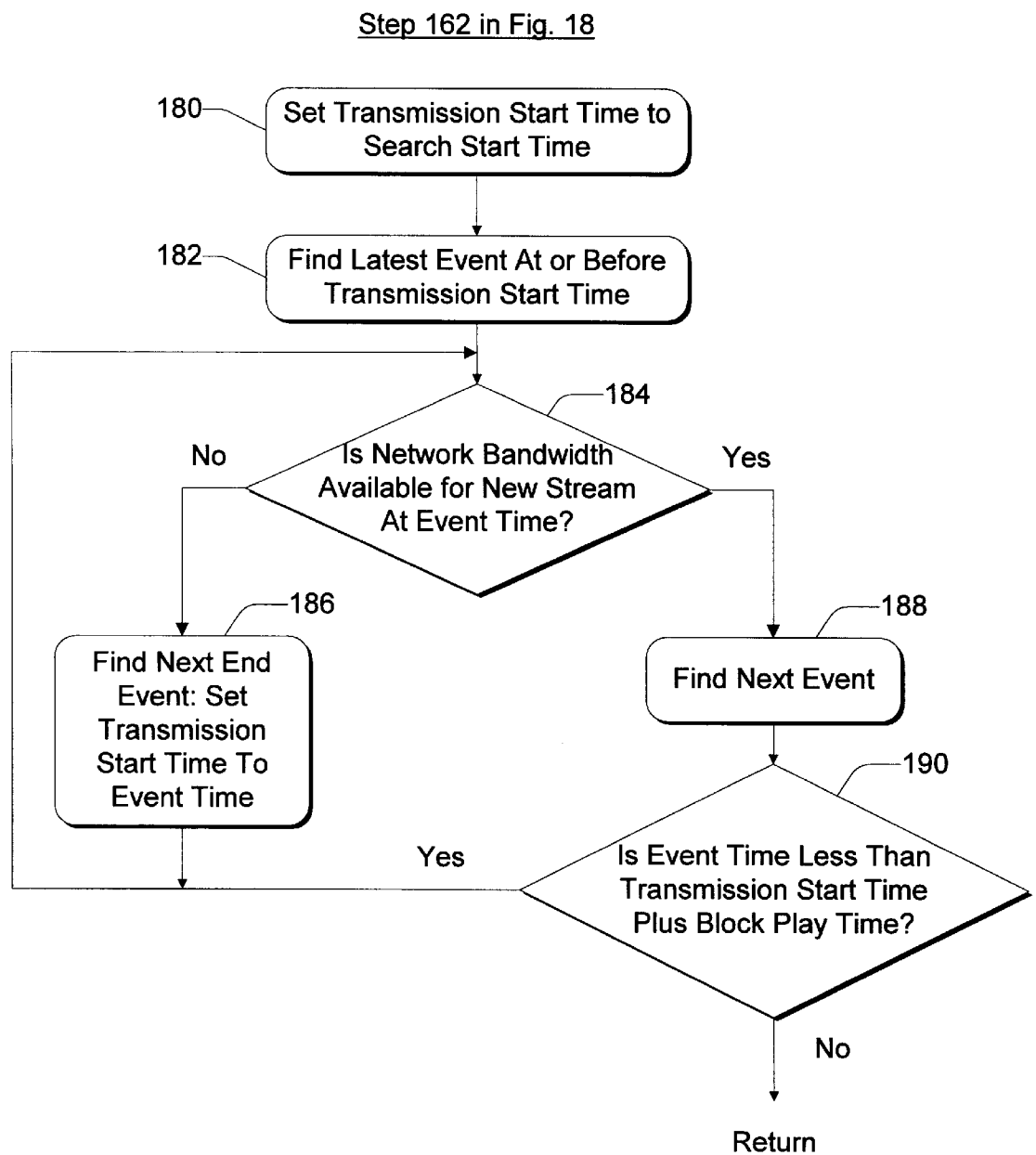

FIG. 19 shows a process for performing step 162 in more detail. At step 180 in FIG. 19, the network scheduler initializes the transmission start time for the new stream to the search start time computed in step 160 of FIG. 18. The network scheduler then identifies the latest event at or before the transmission start time (step 182) and considers the network bandwidth at that point (step 184). The instantaneous bandwidth requirement at that point in the schedule is considered to be the maximum network bandwidth assuming a worst case failure mode to account for the network load of secondary transmissions.

If there is insufficient network capacity, the network scheduler linearly scans later in the schedule to the next end event (i.e., the end of a network send in the network schedule) and moves the transmission start time to the next end event (step 186). The network bandwidth is then reconsidered for this new event. When there is sufficient bandwidth at the event time (i.e., the "yes" branch from step 184), the network scheduler finds the next later event (step 188) and determines whether the event time is less than the transmission start time plus a block play time (step 190). If so, the process considers whether the bandwidth is sufficient at the later event (steps 184–188). On the other hand, if the event time is one block play time later than the transmission start time (i.e., the "no" branch from step 190), then the network scheduler has considered all events that might overlap with the potential new send and found no conflict, and control is returned to step 162 in FIG. 18.

With reference again to FIG. 18, the next step 164 is for the network scheduler to determine whether there is sufficient network bandwidth for the declustered secondary transmissions. This is achieved by examining the aggregate network bandwidth utilization chart, in the same manner described above with reference to FIG. 10. Assuming there is sufficient network bandwidth, the network scheduler calls to the disk scheduler to determine whether there is sufficient disk bandwidth and buffer capacity for transmission of the primary data for both the existing streams and the new stream (step 166). Step 166 is achieved using the process described above with reference to FIGS. 16 and 17.

Assuming sufficient disk and buffer capacity is available, the disk scheduler determines whether there is sufficient disk bandwidth and buffer capacity for the declustered secondary transmissions (step 168). This step is achieved by repeating the process in FIGS. 16 and 17 to account for declustered secondary transmissions.

If all resources are available at the prescribed transmission start time for the new stream, the new stream is inserted into the network schedule (step 170). On the other hand, if any of the evaluation steps 164–168 results in a find of insufficient resources, a new search time (and hence, new transmission start time) is determined and the evaluation steps are repeated (step 172).

New Stream Insertion In The Distributed System

In the distributed multi-rate file server system, each server maintains a queue of pending service requests, ordered according to when they are received. When a viewer requests that a new stream be started, the controller 22 determines the server 24 on which the starting block resides and sends a message to that server to inform it of the request. When the server receives the new stream request, it adds the request to the tail of the pending service queue. The controller 22 also sends the message to the next server in sequence, in case the first server has failed. If the succeeding server has determined that the preceding server has failed, the succeeding server adds the request to the tail of its own pending service queue, with a flag set that indicates that this request is on behalf of the failed server.

As noted above, there is no such thing as slot ownership in the distributed multi-rate file server system. Instead, the servers cooperate to validate the insertion of a new stream.

Figure 20:
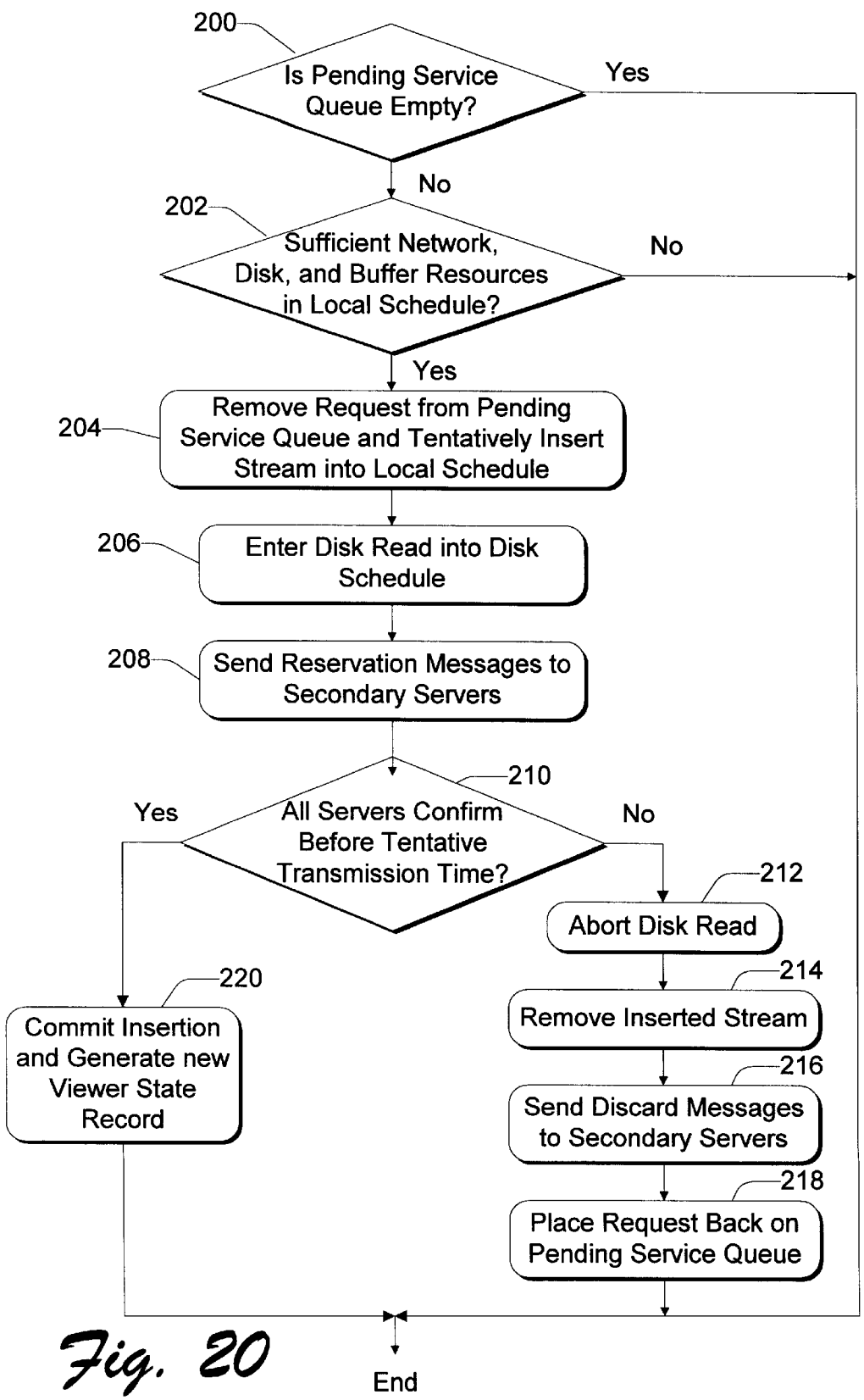
FIG. 20 is a flow diagram showing steps in a method for inserting a new stream into the network schedule, wherein the method is implemented in the distributed file server system of FIG. 6.

FIG. 20 shows a process for inserting a new stream into the network schedule in the distributed multi-rate file server system. Periodically, each server examines its pending service queue to see if there are any stream requests waiting to be serviced (step 200). If the service queue is empty (i.e., the "yes" branch from step 200), the process ends. However, if a request is pending (i.e., the "no" branch from step 200), the server checks its local copy of the schedule to see if it can rule out insertion of the new stream request based only on its view of the schedule. Accordingly, at step 202, the local server examines the network schedule for sufficient available bandwidth and constructs a local disk schedule to determine the availability of sufficient disk bandwidth and buffer capacity. Step 202 is achieved using the processes described above for steps 162 and 166 in the centralized system. If any resource is insufficient (i.e., the "no" branch from step 202), the server can rule out the insertion based solely on its view of the schedule and the process ends. The stream request is kept in the pending service queue for one stream granularity, whereupon it is checked again.

If the server cannot rule out insertion (i.e., the "yes" branch from step 202 in FIG. 20), the local server removes the stream request from the head of the pending service queue and tentatively inserts the new stream into the network schedule (step 204). The local server then enters a disk read for the new stream into the partial disk schedule, as represented by new stream 9 in FIG. 16 (step 206 in FIG. 20). The local server may actually initiate reading data into buffer memory in anticipation that the stream will be approved to transmit at the tentatively scheduled time, even if the new stream is ultimately rejected for that tentatively scheduled time. The local primary server sends messages to those neighboring secondary servers that support the declustered redundant data on behalf of the local server, asking them to validate the insertion (step 208).

Each neighboring secondary server that receives such a message checks its local copy of the network schedule and constructs a local disk schedule for the declustered secondary block, using the process described above for step 168 in the centralized system. If the neighboring server determines that it can accommodate the insertion of the new stream by performing a process identical to step 202, the neighboring secondary server reserves the necessary resources and sends a confirmation message back to the originating primary server. Alternately, if the secondary server determines that it cannot accommodate the new stream insertion, it sends a rejection message back to the originating primary server.

If the originating primary server receives a rejection or does not receive responses from all servers early enough to start sending the initial block of the new stream at the tentatively scheduled time (i.e., the "no" branch from step 210), the primary server will abort the disk read if it has not yet been completed (step 212 in FIG. 20). The primary server removes the tentative insertion from its local copy of the schedule (step 214), and informs the secondary servers to discard their tentative insertions (step 216). The primary server then places the stream request on the tail of the pending service queue and the process ends (step 218 in FIG. 20).

If the originating primary server receives confirmations from all of the secondary servers early enough to start sending the initial block of the new stream at the tentatively scheduled time (i.e., the "yes" branch from step 210), the primary server commits the insertion and generates a new viewer state record for the new stream (step 220). When the secondary servers receive the viewer state record, they replace their tentative schedule insertions with actual schedule entries.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. In a continuous media file server system having multiple data servers connected to distribute data streams over a network, each data server supporting at least one storage disk, wherein data files are distributed across the data servers and stored on each of the storage disks, and wherein not all of the data files have the same transmission rate, a method comprising the following steps:

scheduling when the data servers are to transmit segments of a first size of a first requested data file over the network and when the data servers are to transmit segments of a second size of a second requested data file over the network based on a network schedule arranged to maximize network bandwidth utilization, and wherein the first size is different from the second size;

reading the segments from the disks associated with the data servers prior to when the data servers are scheduled to transmit the segments, and separately, completely transmitting the segments of the first size and the segments of the second size during corresponding transmission times over single communication channels, wherein the transmission times are of equal fixed durations.

2. A method as recited in claim 1, wherein the scheduling step comprises the step of establishing the network schedule that orders a transmission time for the requested data file, the transmission time specifying when the data servers are to transmit the segments of the first and second requested data files over the network.

3. A method as recited in claim 1, wherein the scheduling step comprises the step of scheduling when the data servers are to transmit redundant copies of the segments the first and second requested data files over the network in an event of a failure.

4. A method as recited in claim 1, wherein the scheduling step is performed at each of the data servers.

5. A method as recited in claim 1, wherein the file server system further comprises a controller connected to each of the data servers, and the scheduling step is performed at the controller.

6. A method as recited in claim 1, wherein the reading step further comprises the steps of:
   reading the segments of the first and second requested data files from the disks at an earliest possible time prior to when the data servers are scheduled to transmit the segments; and
   storing the segments of the first and second requested data files at the data servers.

7. A method as recited in claim 1, wherein the reading step further comprises the following steps:
   reading the segments of the first and second requested data files from the disks at an earliest possible time prior to when the data servers are scheduled to transmit the segments, yet without exceeding a preset maximum lead time before the schedule transmission; and
   storing the segments of the first and second requested data files at the data servers.

8. A method as recited in claim 1, wherein the reading step further comprises the step of reading the segments of the first and second requested data files from the disks at a latest possible time prior to when the data servers are scheduled to transmit the segments.

9. In a continuous media file server system having multiple data servers connected to distribute data streams over a network, each data server supporting at least one storage disk, wherein data files are distributed across the data servers and stored on each of the storage disks, and wherein not all of the data files have the same transmission rate, a method comprising the following steps:
   scheduling transmission times of multiple data files of different data transmission rates into a network schedule to maximize network bandwidth utilization, the transmission times within the network schedule indicating a relative order in which the data servers are to transmit corresponding blocks of the data files over the network, and wherein the corresponding blocks of at least two of the data files are different in size;
   reading the blocks from the disks associated with the data servers prior the transmission times in the network schedule; and
   separately, completely transmitting the blocks of the data files over single communication channels in the network during corresponding transmission times, wherein the transmission times are of equal fixed durations.

10. A method as recited in claim 9, wherein the scheduling step comprises the step of scheduling secondary transmission times into the network schedule, the secondary transmission times indicating a relative order in which the data servers are to transmit redundant copies of the blocks in an event of failure.

11. A method as recited in claim 9, further comprising the following steps:
    distributing portions of the network schedule among the data servers; and
    at each of the data servers, transmitting the blocks for the data files that have transmission times listed on the portions of the network schedule presently held by the data servers.

12. A method as recited in claim 11, further comprising the step of circulating respective portions of the network schedule among the data servers to maintain scheduled distribution of the data files.

13. A method as recited in claim 9, wherein the file server system further comprises a controller connected to each of the data servers, and the scheduling step is performed at the controller.

14. A method as recited in claim 9, wherein the network schedule orders the transmission times so that the multiple data streams can be concurrently served without overburdening resources of the file server system.

15. A method as recited in claim 9, wherein the reading step comprises the step of reading the blocks from the disks at an earliest possible time prior to the transmission times.

16. A method as recited in claim 9, wherein the reading step comprises the step of reading the blocks from the disks at an earliest possible time prior to the transmission times without exceeding a preset maximum lead time.

17. A method as recited in claim 9, wherein the reading step comprises the step of reading the blocks from the disks at a latest possible time prior to the transmission times.

18. A method as recited in claim 9, wherein the reading step comprises the step of reading the blocks from the disks at a latest possible time prior to the transmission times and in the event that blocks from two different data streams are to be read concurrently, reading the blocks associated with the data stream with the sooner transmission time first.

19. A method as recited in claim 9, further comprising the step of searching the network schedule for a suitable position to add a new data stream whereby the position in the network schedule does not overload the file server system when serving the existing data stream at their various data transmission rates and the new data stream.

20. A method as recited in claim 19, wherein the network schedule is a linked-list data structure, and the searching step comprises the step of linearly searching the network schedule.

21. A method as recited in claim 19, wherein the network schedule is a linked-list data structure, and the searching step comprises the step of traversing a search tree representative of the network schedule.

22. In a continuous media file server system having multiple data servers connected to distribute data streams over a network, each data server supporting at least one storage disk, wherein data flies are distributed across the data servers and stored on each of the storage disks, and wherein not all of the data files have the same transmission rate, a method comprising the following steps:
    scheduling transmission times of multiple data streams of different data transmission rates into a network schedule to maximize network bandwidth utilization, the transmission times indicating a relative order in which the data servers are to transmit corresponding blocks of the data files over the network, and wherein the corresponding blocks of at least two of the data streams are different in size;

in an event that a new data stream is requested, searching the network schedule for a suitable position to add the new data stream without overloading resources of the file server system; and separately, completely transmitting the blocks of the data files over single communication channels in the network during corresponding transmission times, wherein the transmission times are of equal fixed durations.

23. A method as recited in claim 22, wherein the network schedule is a linked-list data structure, and the searching step comprises the step of linearly searching the network schedule.

24. A method as recited in claim 22, wherein the network schedule is a linked-list data structure, and the searching step comprises the step of traversing a search tree representative of the network schedule.

25. A method as recited in claim 22, wherein the data servers have buffer memory to temporarily store data read from the disks prior to transmission over the network, the method further comprising the step of examining whether a data block from a new data file, if the new data file is read at a particular location in the network schedule, would cause the buffer memory capacity to be exceeded.

26. A method as recited in claim 22, further comprising the step of adding the new data stream to the network schedule if the suitable position is found.

27. A method for operating a data server in a continuous media file server system having multiple data servers connected to distribute data streams over a network, each data server supporting at least one storage disk, wherein data files are distributed across the data servers and stored on each of the storage disks, and wherein not all of the data files have the same transmission rate, the method comprising the following steps:

receiving a portion of a network schedule from a preceding data server, the network schedule containing transmission times of one or more data streams of one or more data transmission rates wherein the transmission times indicate a relative order in which the data streams are to be played to maximize network bandwidth utilization;

reading data blocks from the data files that have corresponding transmission times on the portion of the network schedule, said reading step occurring prior to the transmission times; and transmitting the data blocks over single communication channels during the transmission times in the portion of the network schedule, and wherein the data blocks of at least two of the data files are different in size, and each of the transmission times is of an equal fixed duration.

28. A method as recited in claim 27, further comprising the step of passing the portion of the network schedule to a succeeding data server and receiving a new portion of the network schedule from the preceding data server.

29. A method as recited in claim 27, further comprising the following steps:

storing the data block temporarily in buffer memory; and evaluating whether reading another data block, in an event that a new transmission time for a new data file is added to the portion of the network schedule, would cause the buffer memory capacity to be exceeded.

30. A method as recited in claim 29, further comprising the step of tentatively inserting the new transmission time into the portion of the network schedule if reading said another data block does not cause the buffer memory capacity to be exceeded.

31. A method as recited in claim 29, further comprising the step of sending a message to at least one succeeding data server requesting the succeeding data server to confirm whether it can accommodate the new data file in the succeeding data server's portion of the network schedule.

32. A continuous media file server system, comprising:

multiple data servers, each data server supporting at least one storage disk, wherein data files are distributed across the data servers so that data blocks of the data files are stored on each of the storage disks, and not all of the data files have the same transmission rate and therefore the corresponding data blocks of at least two of the data files are different in size;

a controller coupled to the data servers;

a network switch coupled to the data servers;

a scheduler to maintain a network schedule that provides a relative ordering of transmission ties of requested data files, the transmission times indicating when the data servers are to transmit corresponding data blocks of the requested data files over the network switch to maximize network bandwidth utilization; and the data servers reading the data blocks from the disks prior to the transmission times in the network schedule, and wherein each of the transmission times is of an equal fixed duration and associated with transmitting the data blocks over single communication channels.

33. A continuous media file server system as recited in claim 32, wherein the scheduler resides at the controller and maintains a master network schedule.

34. A continuous media file server system as recited in claim 32, wherein the scheduler resides at each of the data servers and maintains portions of the network schedule pertinent to each of the data servers.

35. A continuous media file server system as recited in claim 32, wherein the blocks are transmitted for a constant duration and the data blocks are variable in size.

36. A continuous media file server system as recited in claim 32, wherein the data servers read the data blocks from the disks at an earliest possible time prior to the transmission times.

37. A continuous media file server system as recited in claim 32, wherein the data servers read the data blocks from the disks at an earliest possible time prior to the transmission times without exceeding a preset maximum lead time.

38. A continuous media file server system as recited in claim 32, wherein the data servers read the data blocks from the disks at a latest possible time prior to the transmission times.

39. A continuous media file server system as recited in claim 32, wherein the data servers read the data blocks from the disks at a latest possible time prior to the transmission times and in an event that blocks from two different data streams are to be read concurrently, the data servers read the blocks associated with the data stream with the sooner transmission time.

40. A continuous media file server system as recited in claim 32, wherein the scheduling unit evaluates the network schedule to determine whether a new data file can be added without overburdening the data servers.

41. An interactive television system comprising the continuous media file server system as recited in claim 32.

42. A network content provider comprising the continuous media file server system as recited in claim 32.

43. A network scheduler embodied as a computer program on a computer-readable medium, the network scheduler being implemented in a continuous media file server system having multiple data servers connected to distribute data streams over a network, each data server supporting at least one storage disk, wherein data files are distributed across the data servers and stored on each of the storage disks, and not all of the data files have the same transmission rate, the network scheduler comprising:

- code means for scheduling transmission times of multiple requested data files of different data transmission rates into a network schedule, the transmission times within the network schedule indicating a relative order in which the data servers are to transmit corresponding blocks of the data files over the network to maximize network bandwidth utilization; and
- code means for instructing the data servers to read the blocks for the requested data files prior their corresponding transmission times in the network schedule, and wherein the blocks of at least two of the data files are different in size, and each of the transmission times is of an equal fixed duration and associated with transmitting the blocks over single communication channels.

44. A network scheduler as recited in claim 43, further comprising code means for determining whether a new data stream can be added to the network schedule.

45. A network scheduler as recited in claim 43, further comprising code means for scheduling secondary transmission times into the network schedule, the secondary transmission times indicating a relative order in which the data servers are to transmit redundant copies of the blocks in an event of failure.

46. A network scheduler as recited in claim 43, wherein the network schedule is a linked-list data structure.

47. A network scheduler as recited in claim 43, wherein the data servers have buffer memory to temporarily store data read from the disks prior to transmission, the network scheduler further comprising code means for examining whether a data block from the new data file, if the new data file is read at a particular location in the network schedule, would cause the buffer memory capacity to be exceeded.

48. A network scheduler embodied as a computer program on a computer-readable medium resident at a data server, the data server being part of a continuous media file server system having multiple data servers connected to distribute data streams over a network, each of the data servers supporting at least one storage disk, wherein data files are distributed across the data servers and stored on each of the storage disks, and wherein not all of the data files have the same transmission, rate, the network scheduler comprising:

- code means for receiving a portion of a network schedule from a preceding data server, the network schedule containing transmission times of one or more data files of one or more data transmission rates wherein the transmission times indicate a relative order in which the data files are to be played to maximize network bandwidth utilization;
- code means for instructing the data server to read a data block from the data files that have corresponding transmission times on the portion of the network schedule, prior to the transmission times; and
- code means for instructing the data server to transmit the data blocks during the transmission times in the portion of the network schedule, and wherein the corresponding blocks of at least two of the data files are different in size, and each of the transmission times is of an equal fixed duration and associated with transmitting the data blocks over single communication channels.

49. A network scheduler as recited in claim 48, further comprising:

- code means for determining whether a new data stream can be inserted into the portion of the network schedule; and
- code means for sending a message to at least one succeeding data server requesting whether the succeeding data server can accommodate the new data stream in a portion of the network schedule held by the succeeding data server.

* * * * *

UNITED STATES PATENT AND TRADEMARK OFFICE
CERTIFICATE OF CORRECTION

PATENT NO. : 6,134,596  
DATED : October 17, 2000  
INVENTOR(S) : William J. Bolosky et al.

Page 1 of 1

It is certified that error appears in the above-identified patent and that said Letters Patent is hereby corrected as shown below:

Column 5,  
Line 38, change "Each" to -- Even --.

Column 28,  
Line 60, change "flies" to -- files --.

Column 30,  
Line 23, change "ties" to -- times --.

Signed and Sealed this

Sixteenth Day of October, 2001

*Attest:*

*Nicholas P. Godici*

*Attesting Officer*

NICHOLAS P. GODICI  
*Acting Director of the United States Patent and Trademark Office*